US010477853B2

(12) United States Patent
Wheeler et al.

(10) Patent No.: US 10,477,853 B2
(45) Date of Patent: Nov. 19, 2019

(54) HEATING CHAMBER SYSTEM AND METHOD FOR INSECT EXTERMINATION

(71) Applicant: ZappBug, Inc., Seattle, WA (US)

(72) Inventors: Cameron Todd Wheeler, Edmonds, WA (US); Rosalie Siobhan Eckert-Jantzie, Seattle, WA (US); Tiffany Michelle Larson, Seattle, WA (US); Matthew John Scanlan, Seattle, WA (US)

(73) Assignee: ZAPPBUG, INC., Seattle, WA (US)

( * ) Notice: Subject to any disclaimer, the term of this patent is extended or adjusted under 35 U.S.C. 154(b) by 376 days.

(21) Appl. No.: 15/170,798

(22) Filed: Jun. 1, 2016

(65) Prior Publication Data

US 2016/0353728 A1 Dec. 8, 2016

Related U.S. Application Data

(60) Provisional application No. 62/171,163, filed on Jun. 4, 2015.

(51) Int. Cl.
*A01M 1/20* (2006.01)
*A01M 19/00* (2006.01)
*A01M 1/22* (2006.01)
*F24H 3/02* (2006.01)
*G06F 3/0488* (2013.01)
*A01M 13/00* (2006.01)

(52) U.S. Cl.
CPC ............ *A01M 1/22* (2013.01); *A01M 1/2094* (2013.01); *A01M 13/003* (2013.01); *A01M 19/00* (2013.01); *F24H 3/02* (2013.01); *G06F 3/04883* (2013.01); *A01M 2200/01* (2013.01)

(58) Field of Classification Search
CPC .. A01M 1/2094; A01M 13/00; A01M 13/003; A01M 17/00; A01M 19/00
USPC ................................ 43/132.1, 123, 125, 129
See application file for complete search history.

(56) References Cited

U.S. PATENT DOCUMENTS 3,419,915 A * 1/1969 Clark, Jr. ............. A61H 33/063
392/379
4,716,676 A * 1/1988 Imagawa ............ A01M 17/008
422/26

(Continued)

FOREIGN PATENT DOCUMENTS

JP 2007289007 A 11/2007
RU 2111662 C1 5/1998
WO 2012037111 A1 3/2012

OTHER PUBLICATIONS

International Search Report and Written Opinion dated Sep. 29, 2016, International Patent Application No. PCT/US2016/035510, filed Jun. 2, 2016.

*Primary Examiner* — Darren W Ark
(74) *Attorney, Agent, or Firm* — Davis Wright Tremaine LLP

(57) ABSTRACT

A heating chamber system for heat-treating items infested by insects, and methods for manufacturing and using same. The heating chamber system includes an enclosed heating chamber; a bottom portion defining a portion of the enclosed heating chamber and includes a floor skirt and a floor; a top portion defining a portion of the enclosed heating chamber and including a plurality of sidewalls and a roof; and a collapsible architecture configured to support the top portion.

13 Claims, 37 Drawing Sheets

(56) References Cited

U.S. PATENT DOCUMENTS

| | | | | |
|---|---|---|---|---|
| 4,817,329 A * | 4/1989 | Forbes | A01M 1/2094 | 43/124 |
| 5,331,991 A * | 7/1994 | Nilsson | A62B 13/00 | 135/93 |
| 6,376,805 B2 * | 4/2002 | Faries, Jr. | A61F 7/0241 | 219/385 |
| 6,612,067 B2 * | 9/2003 | Topp | A01M 19/00 | 422/307 |
| 7,481,234 B1 * | 1/2009 | Gustafson | E04H 15/425 | 135/156 |
| 7,926,222 B2 * | 4/2011 | Molnar | A01M 1/2094 | 43/124 |
| 8,476,555 B2 * | 7/2013 | Diedrick | B23K 9/1336 | 219/137.2 |
| 8,479,440 B2 * | 7/2013 | DeMonte | A01M 1/2094 | 126/110 B |
| 8,742,296 B2 * | 6/2014 | Bermudez | A47C 31/007 | 165/46 |
| 9,101,125 B2 * | 8/2015 | Knote | A01M 1/2094 | |
| 9,186,743 B2 * | 11/2015 | Radtke | B23K 9/1006 | |
| 9,226,489 B2 * | 1/2016 | Pattison | A01M 1/2094 | |
| 9,247,725 B2 * | 2/2016 | Hosli | A01M 1/20 | |
| 9,265,241 B2 * | 2/2016 | Raud | A01M 1/2094 | |
| 9,326,498 B2 * | 5/2016 | Lindsey | A01M 1/2094 | |
| 9,398,765 B2 * | 7/2016 | Maloney | A01M 1/2094 | |
| 9,459,022 B2 * | 10/2016 | Krupp | F24H 3/025 | |
| 9,532,561 B2 * | 1/2017 | Mladek | A01M 1/2094 | |
| 9,609,857 B2 * | 4/2017 | Nugent | A01M 1/2094 | |
| 10,070,639 B2 * | 9/2018 | Pattison | A01M 1/2094 | |
| 2003/0026727 A1 * | 2/2003 | Topp | A01M 19/00 | 422/1 |
| 2004/0035044 A1 * | 2/2004 | Topp | A01M 19/00 | 43/124 |
| 2005/0108920 A1 * | 5/2005 | Takenoshita | A01M 1/2094 | 43/132.1 |
| 2005/0246942 A1 * | 11/2005 | Mueller | A01M 1/2094 | 43/124 |
| 2007/0084105 A1 * | 4/2007 | Lindsay | A01M 1/2094 | 43/129 |
| 2011/0289825 A1 * | 12/2011 | James | A01M 1/2094 | 43/132.1 |
| 2012/0317870 A1 * | 12/2012 | Pratt | A01M 5/02 | 43/132.1 |
| 2013/0269239 A1 * | 10/2013 | Whitley | A01M 1/2094 | 43/132.1 |
| 2013/0276358 A1 | 10/2013 | Knote et al. | | |
| 2014/0290124 A1 * | 10/2014 | Aidan | A01M 1/2094 | 43/132.1 |
| 2015/0052800 A1 * | 2/2015 | Timbrook, Jr. | A01M 1/2094 | 43/132.1 |

* cited by examiner

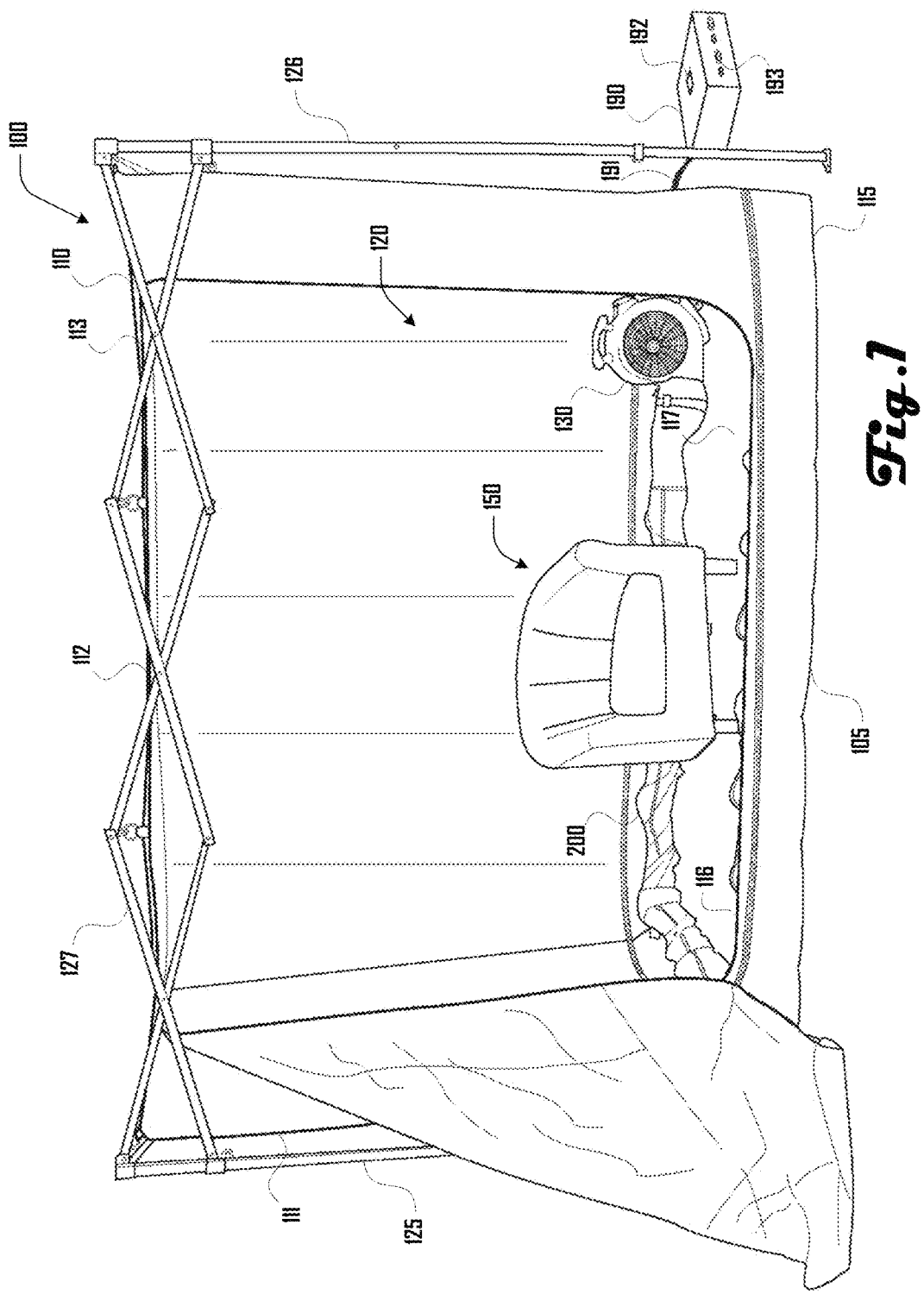

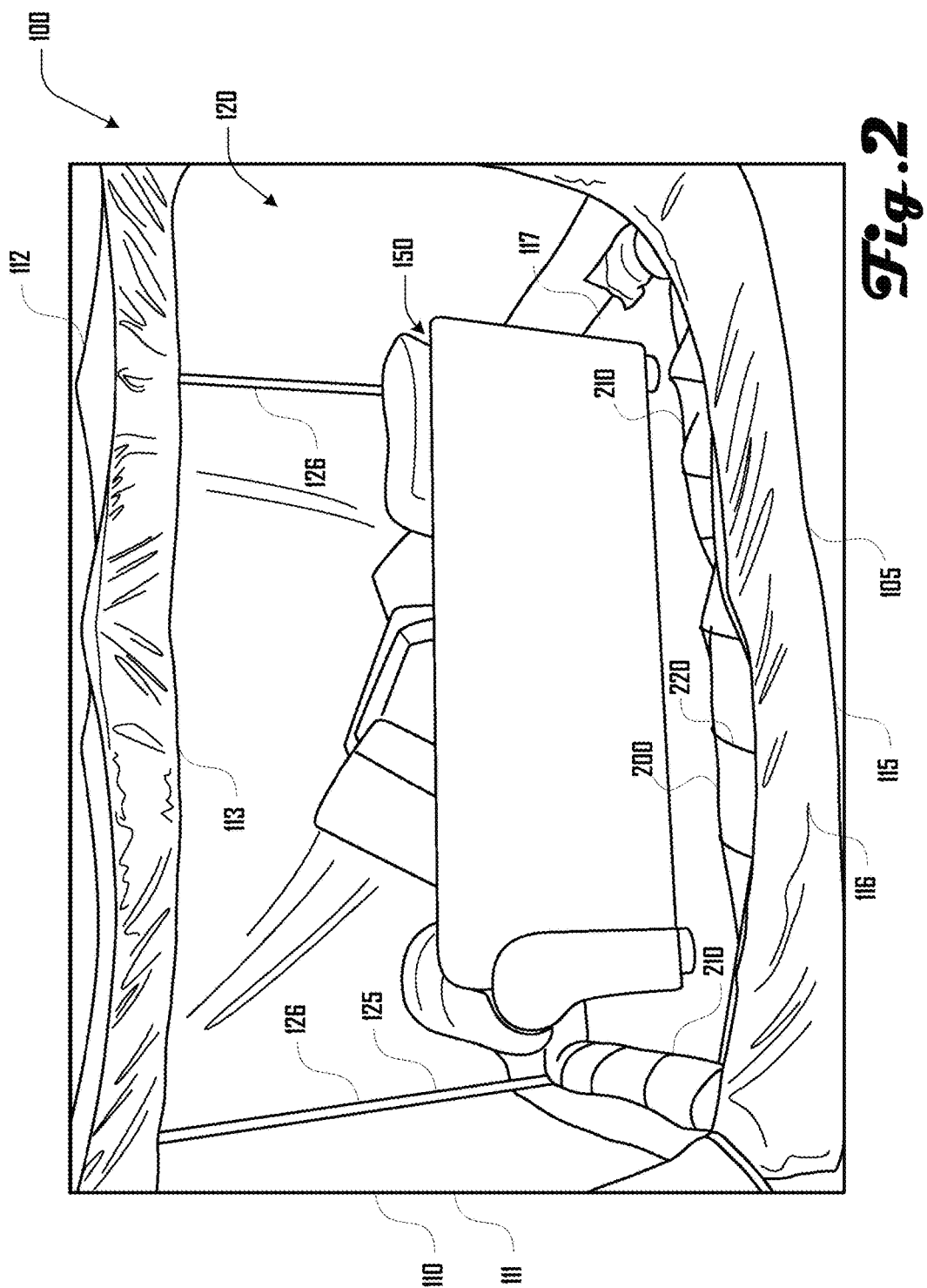

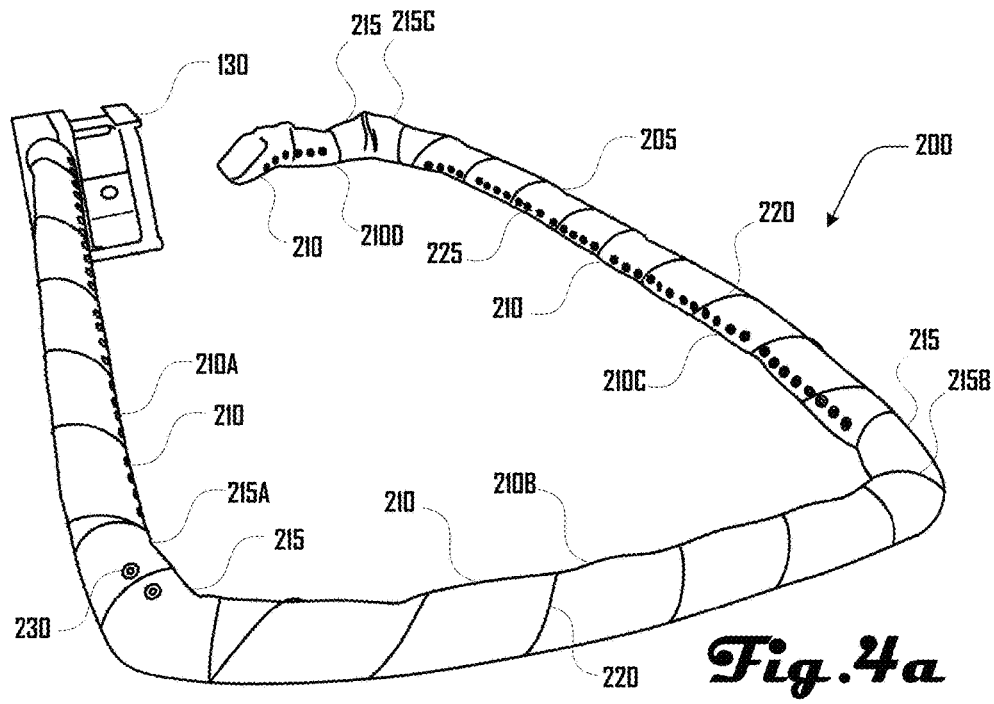
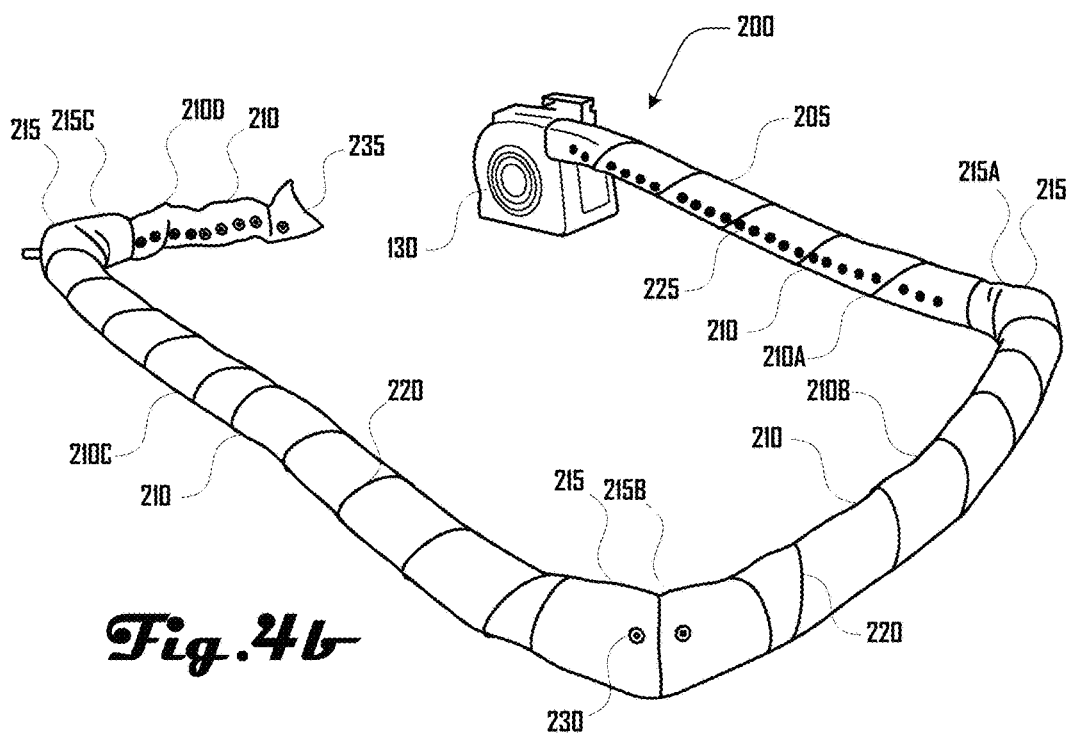

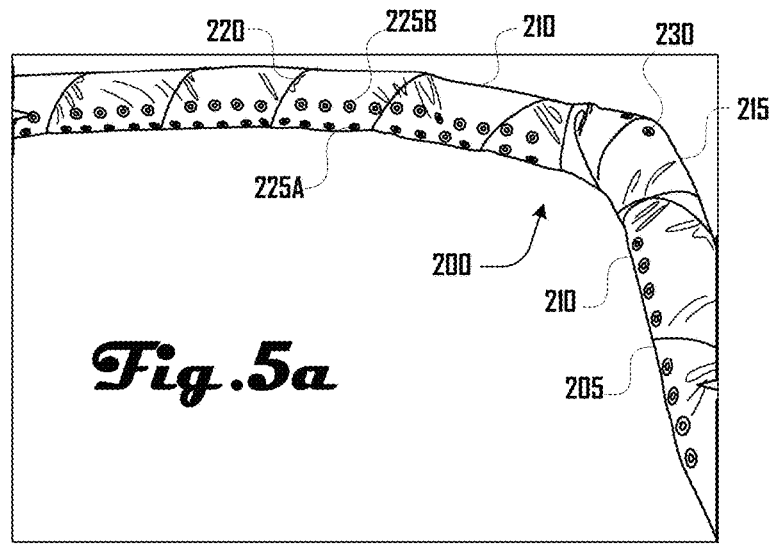
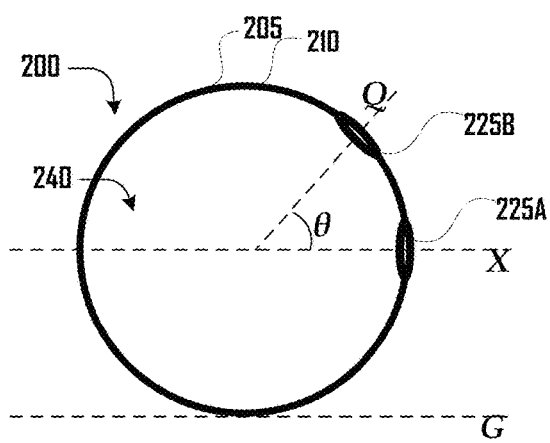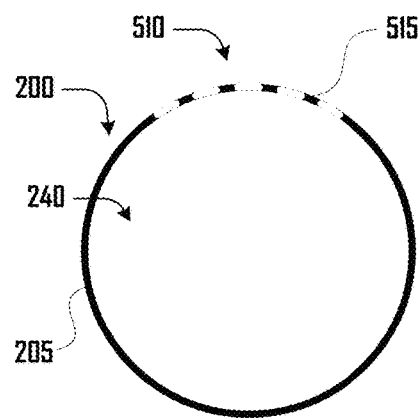
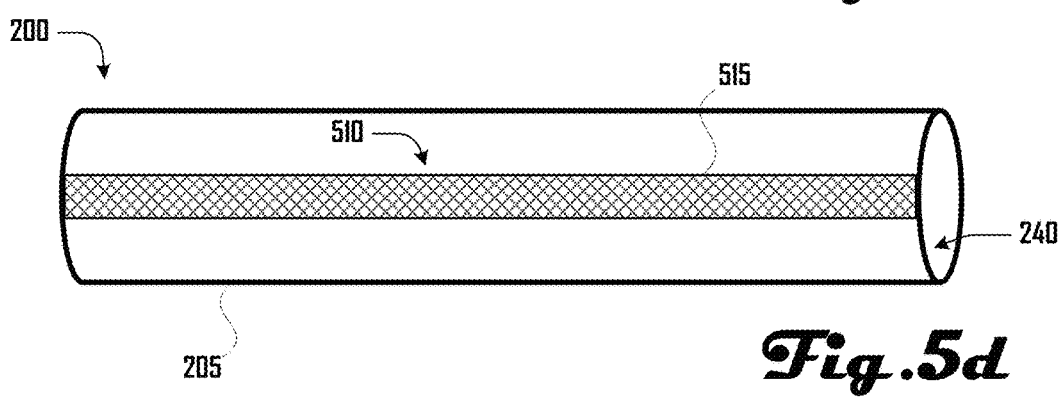

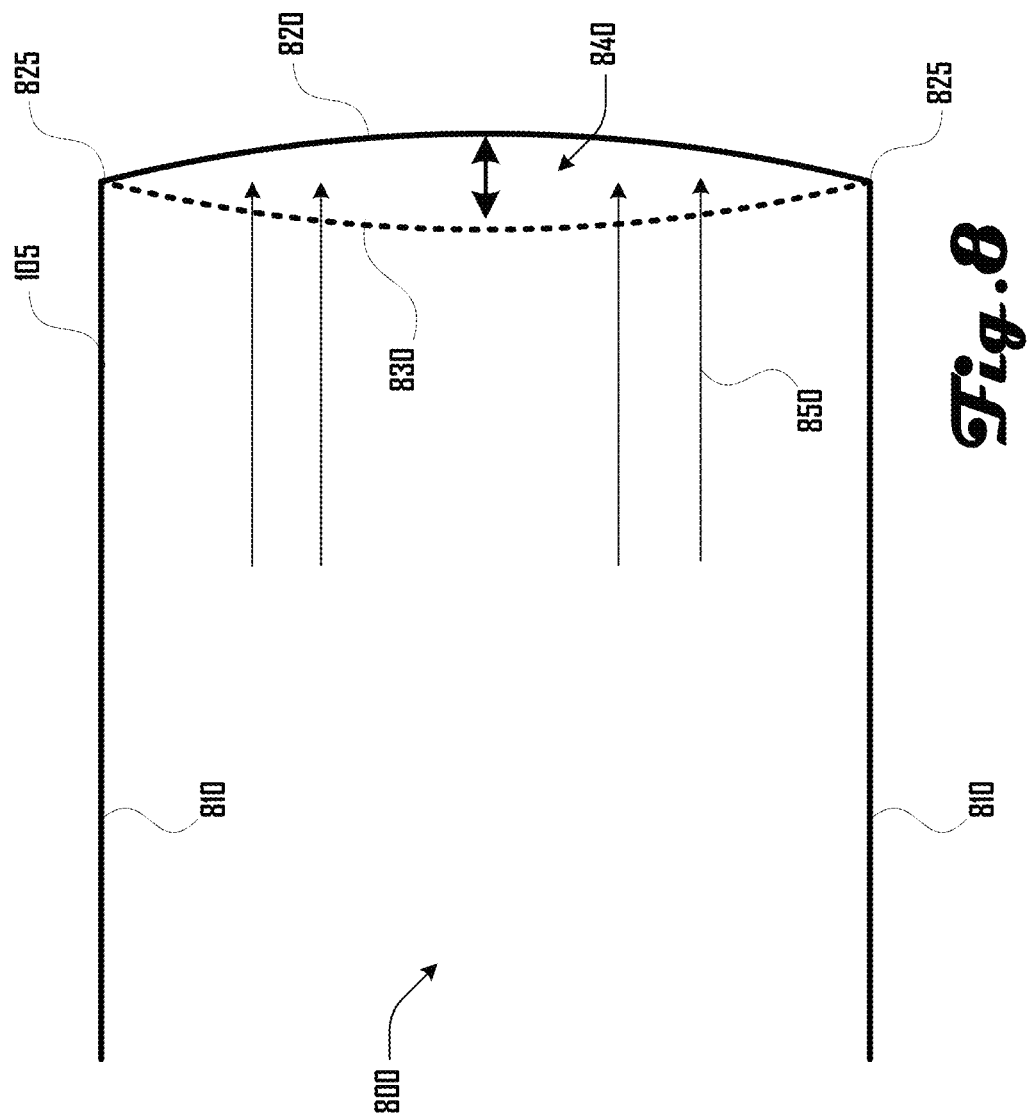

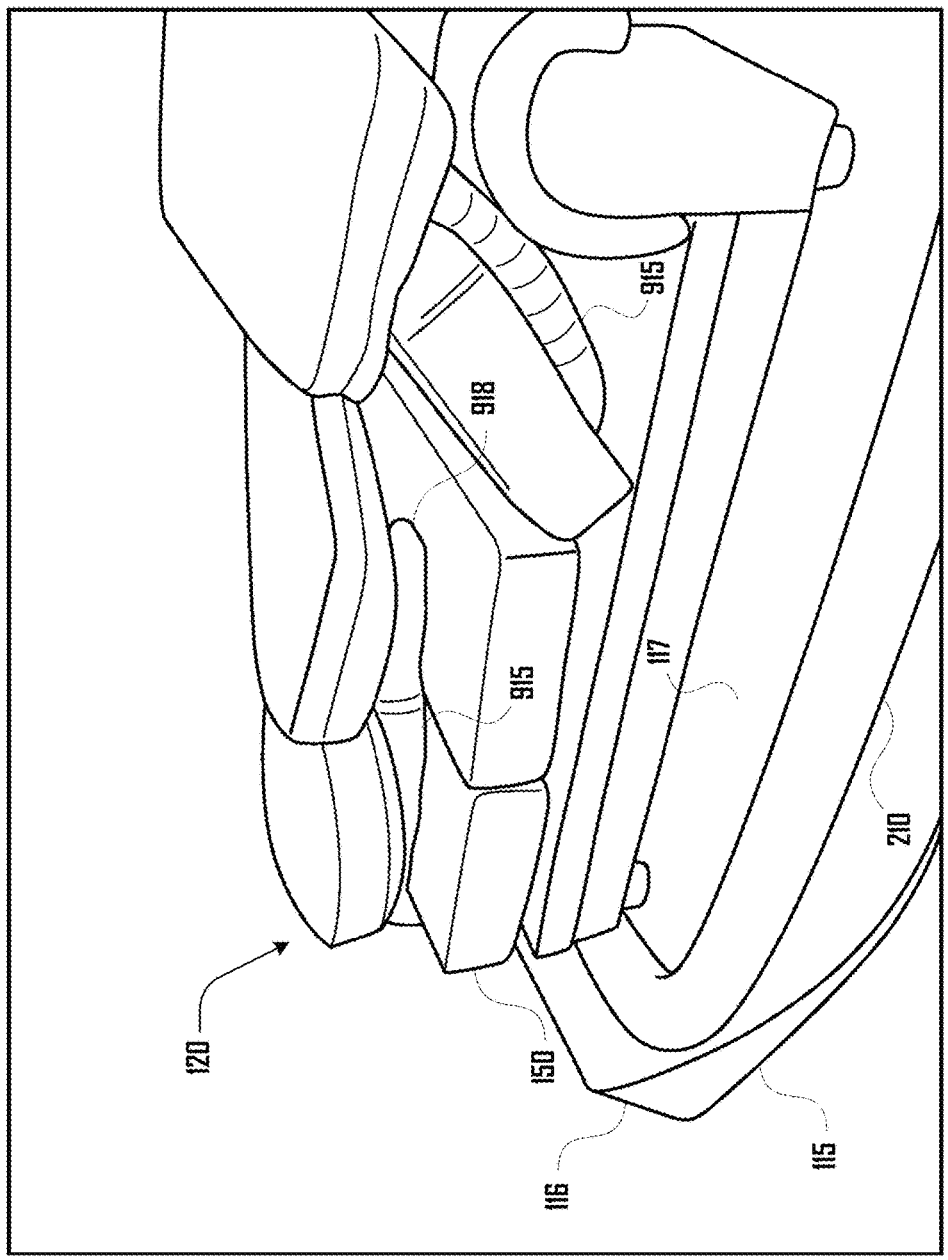

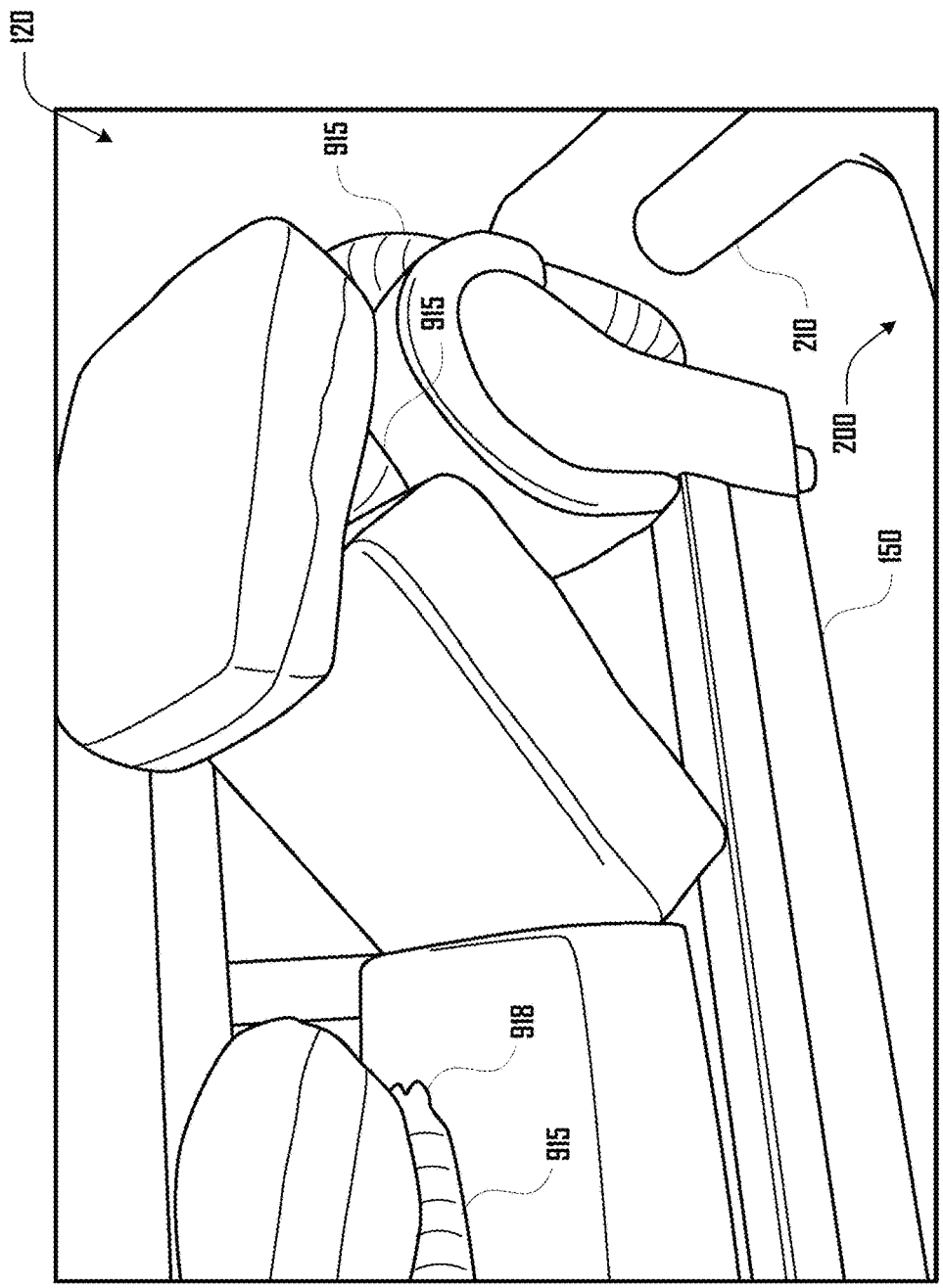

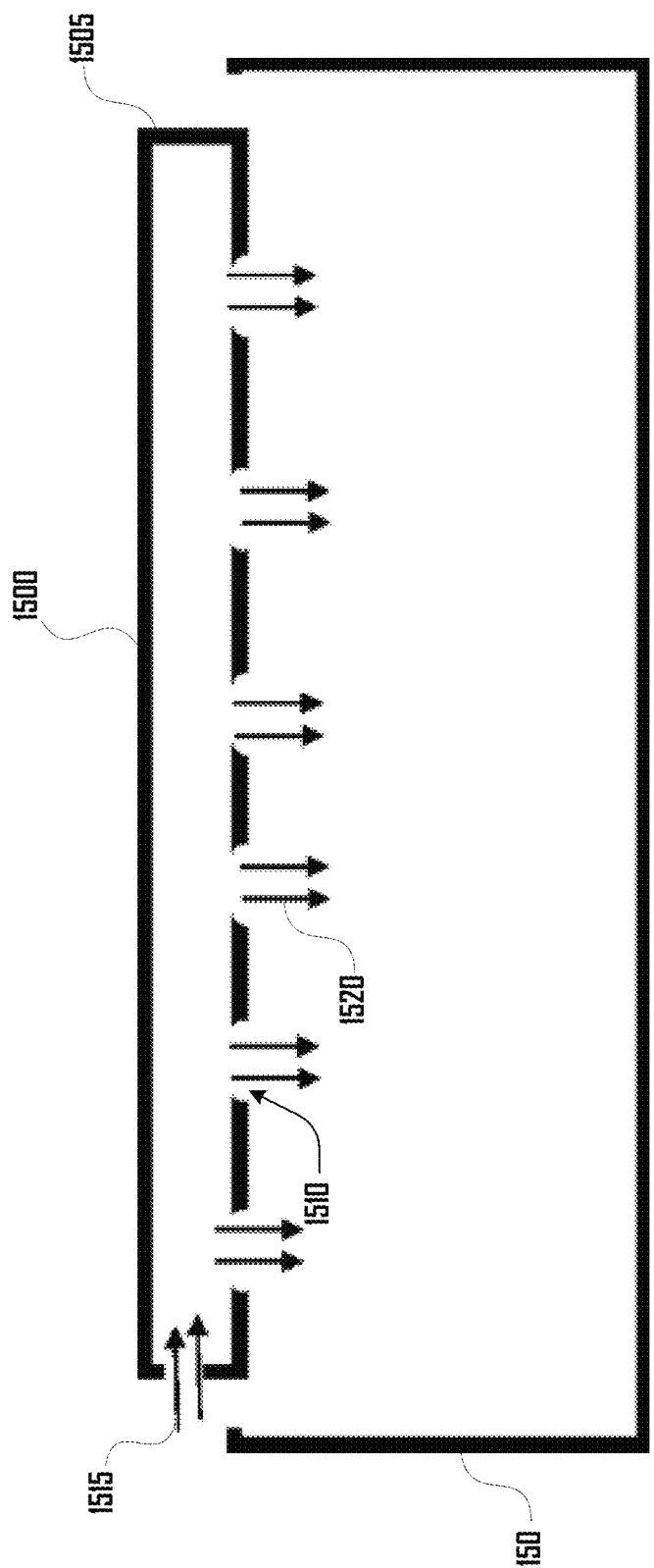

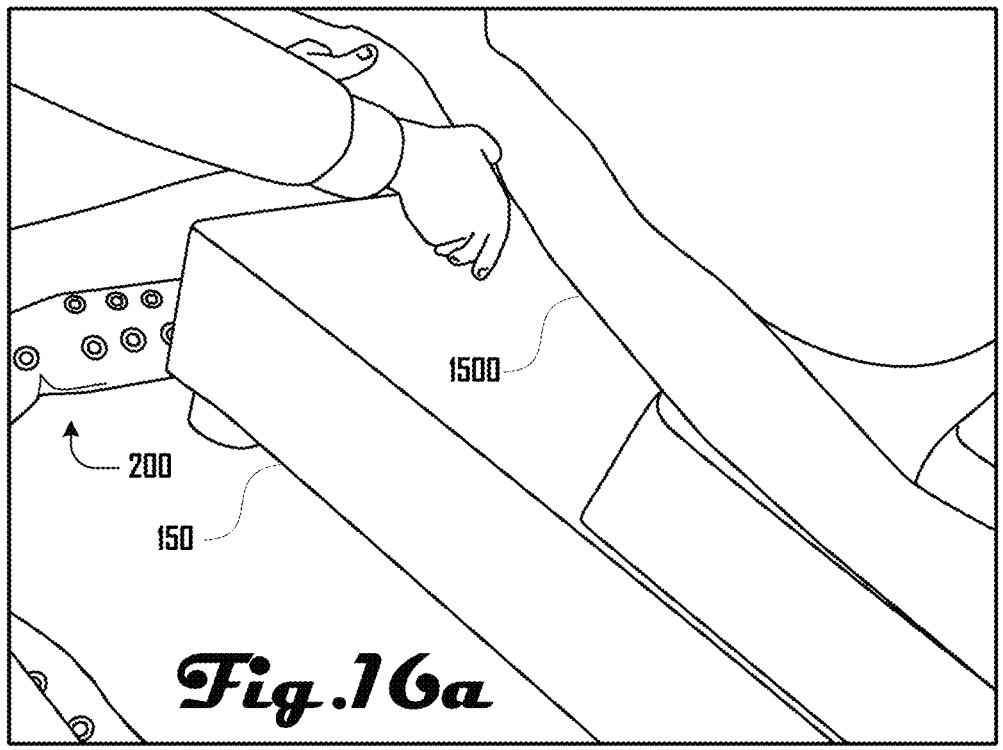
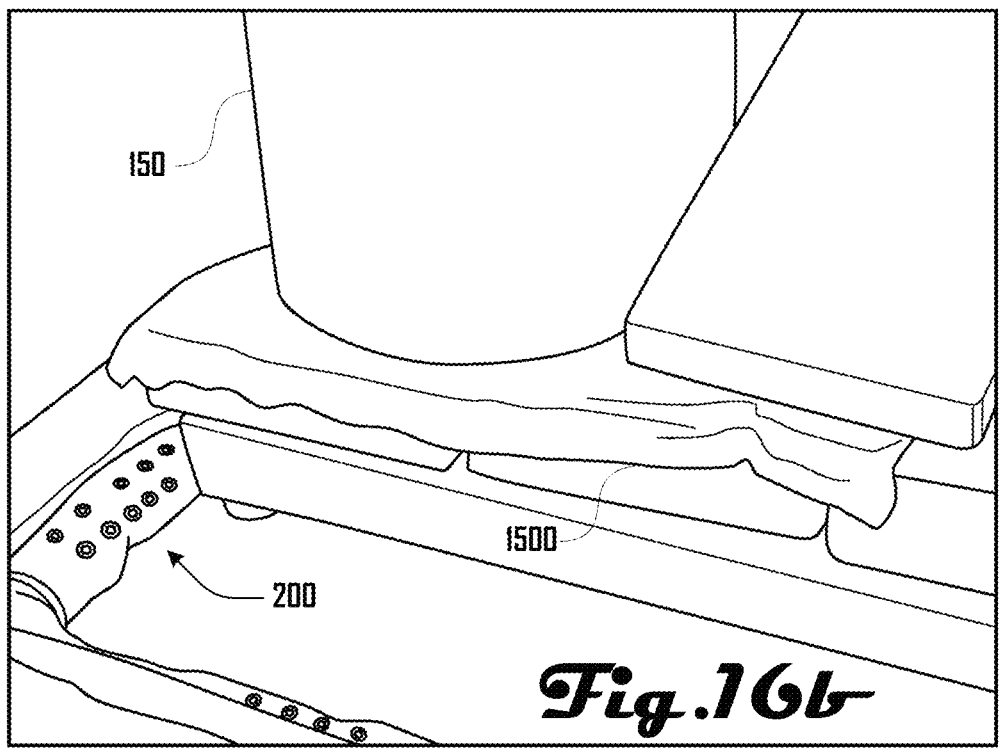

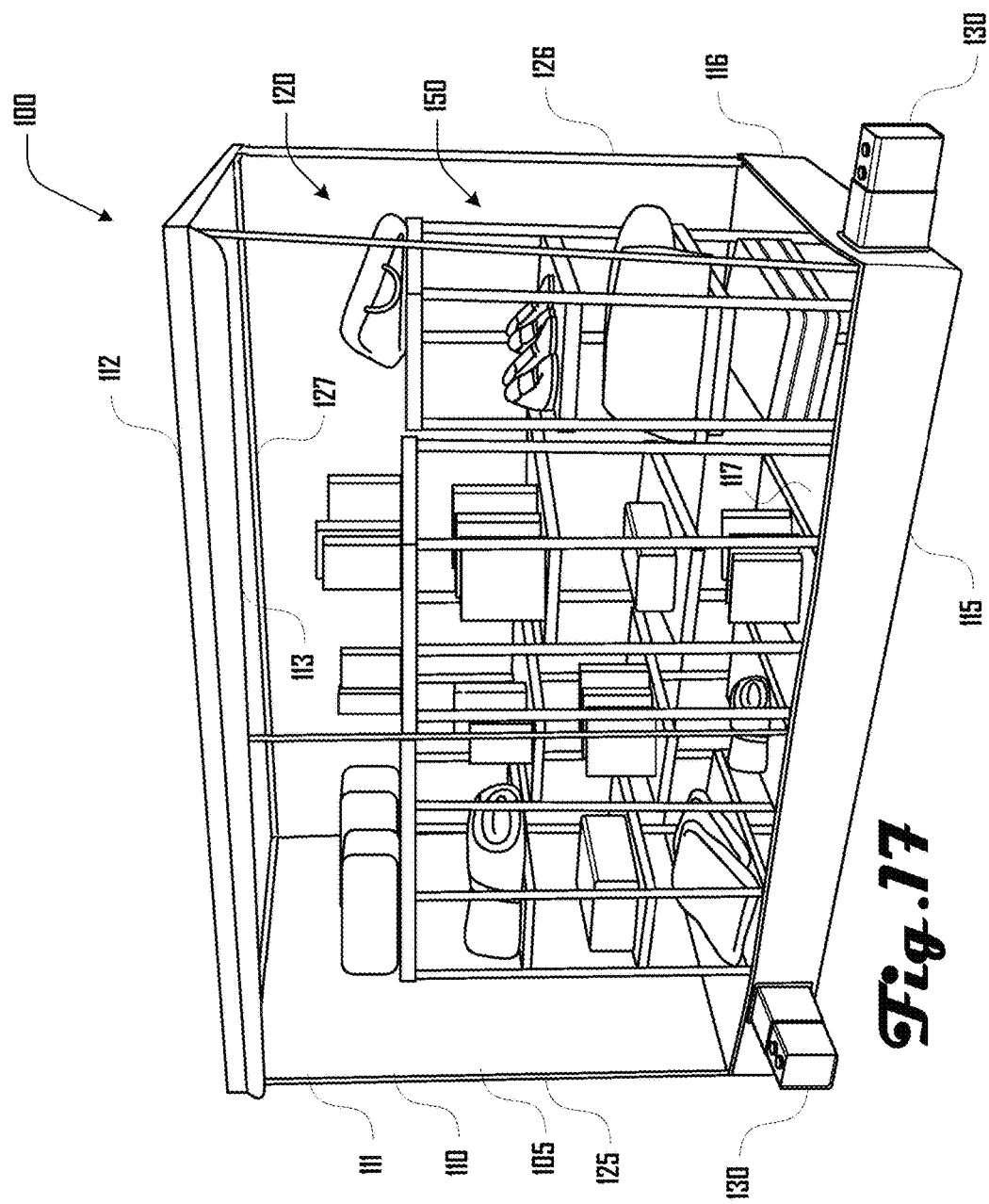

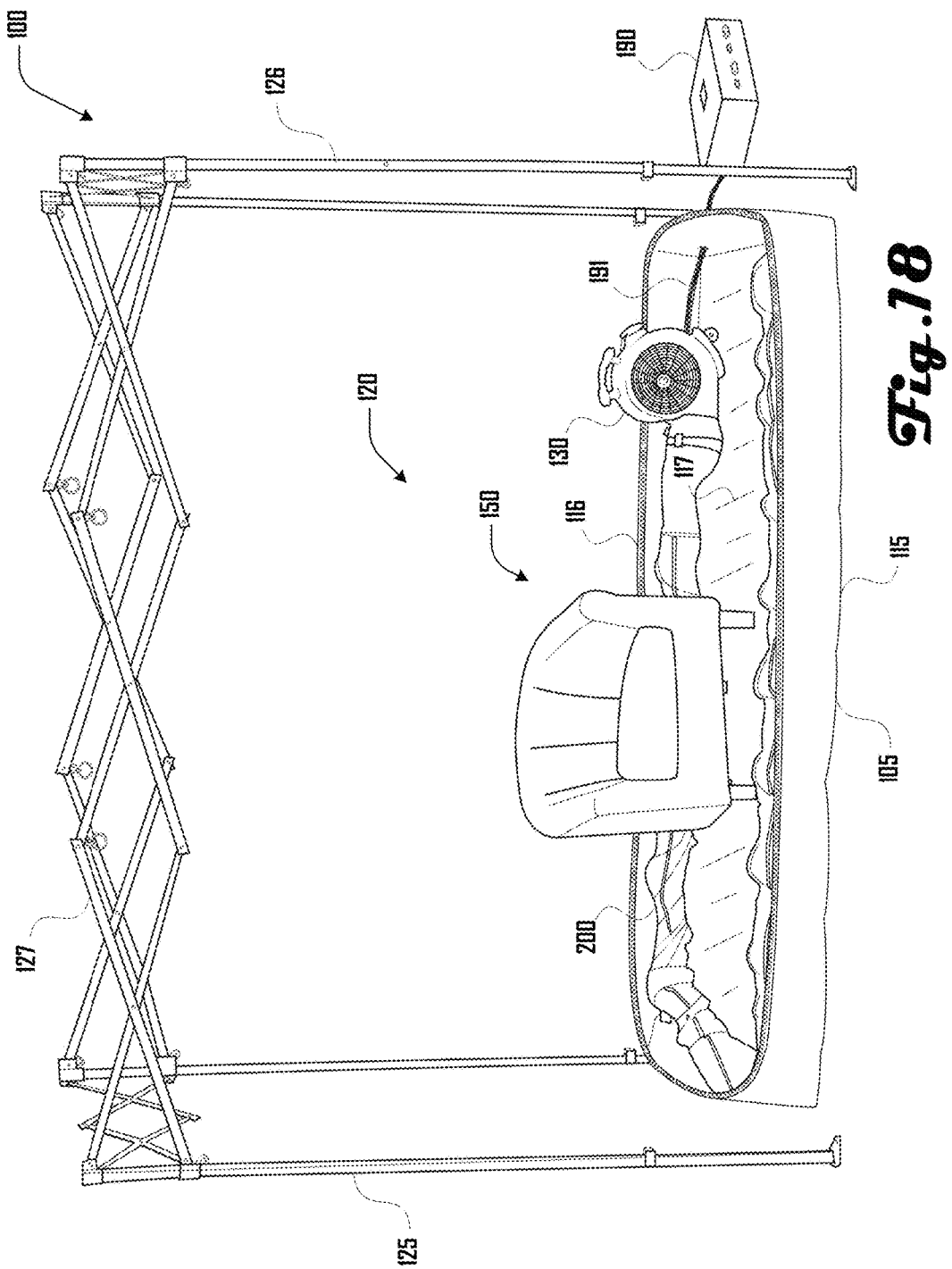

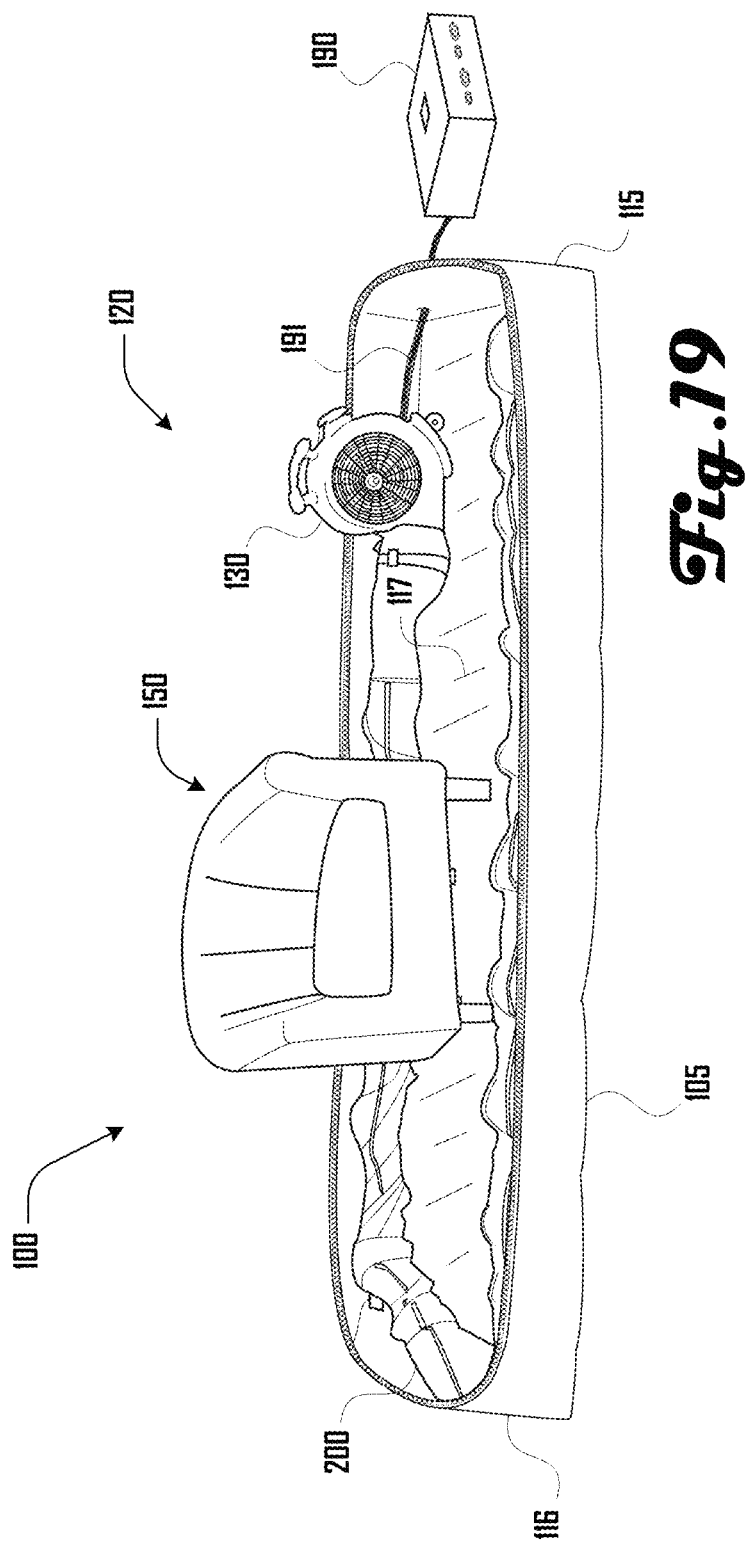

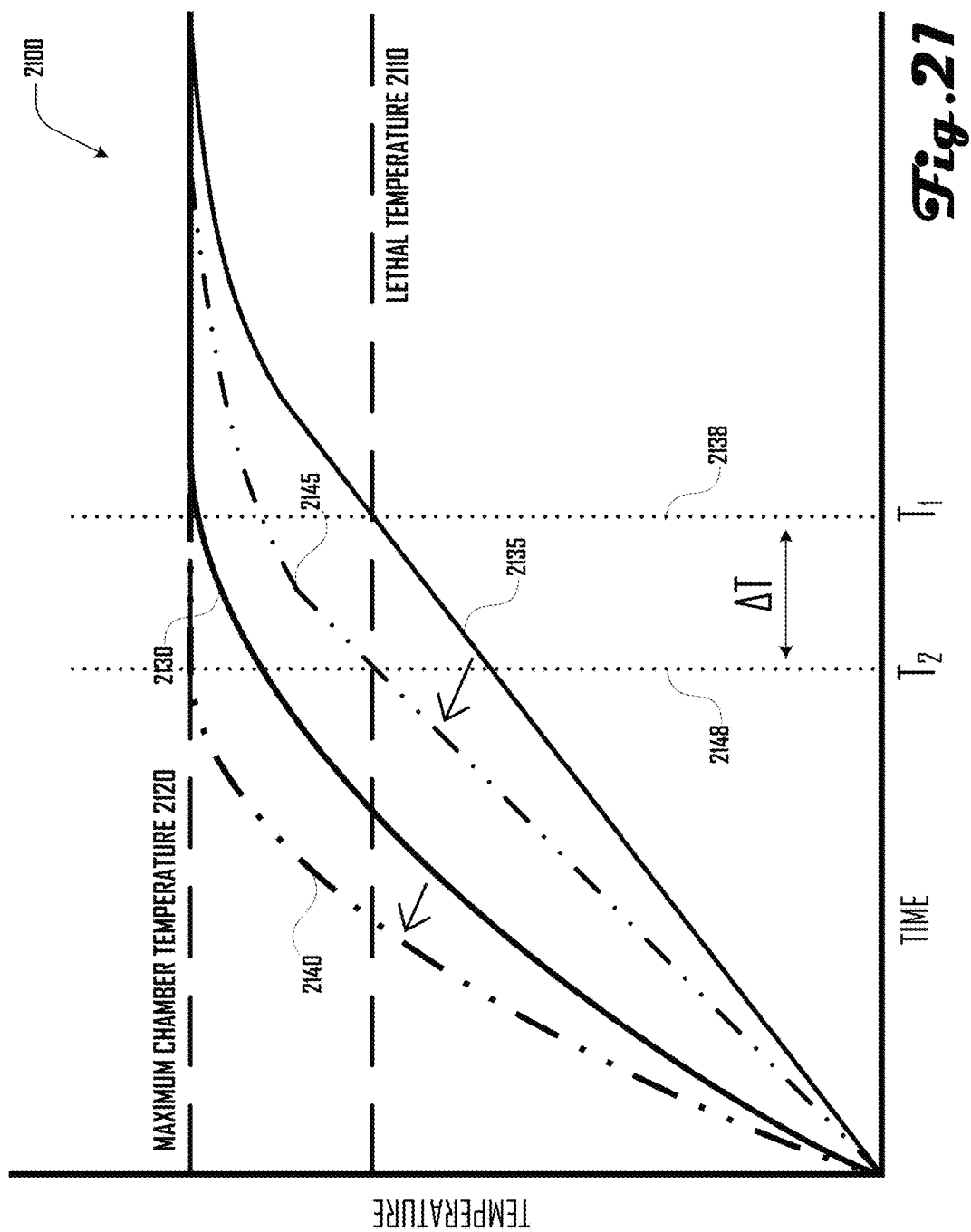

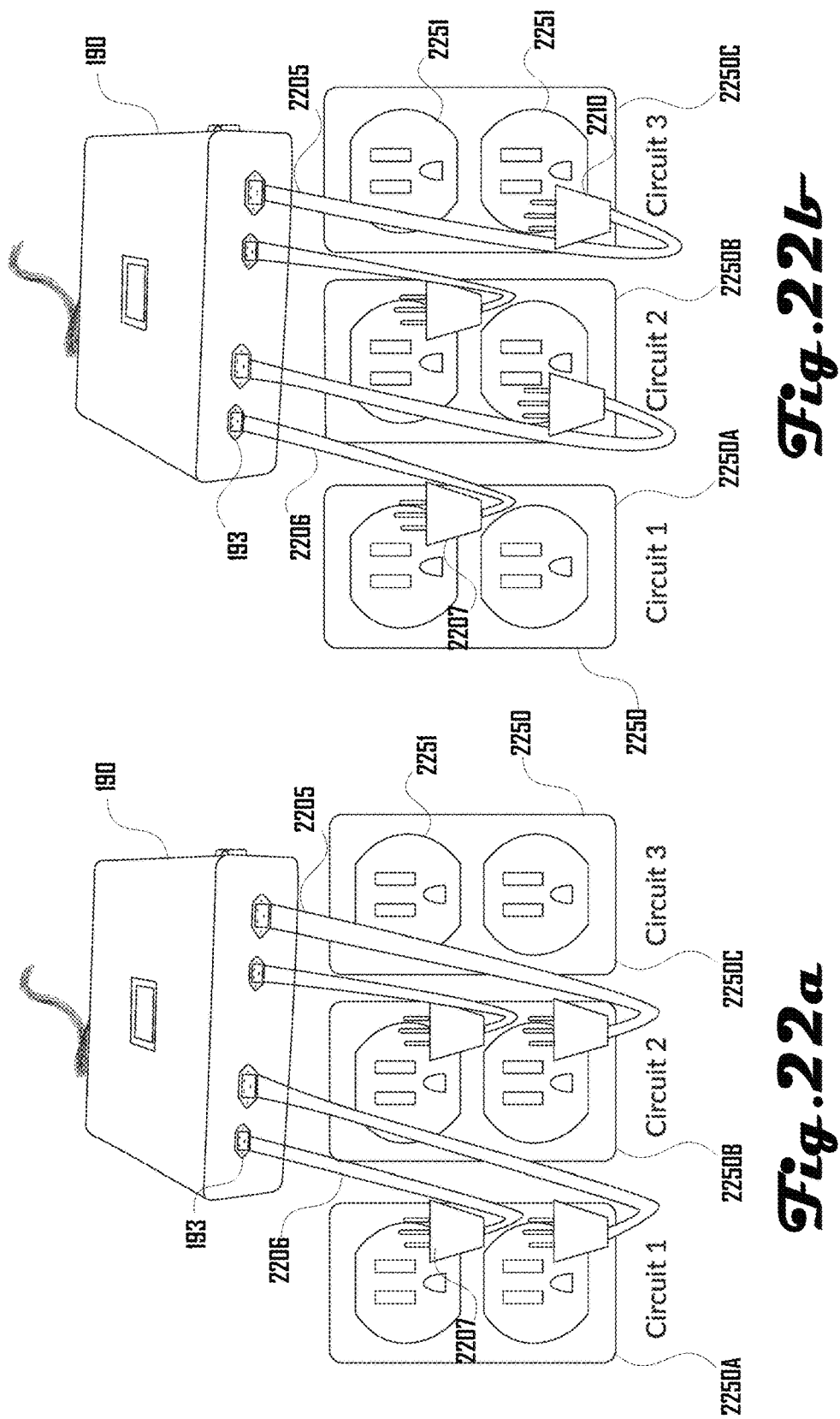

Fig. 35

12/12/2015 edit

Current Treatment - 2:48pm

| Air temp | Probe 1 | Probe 2 | Probe 3 | ETA | Status | Time |
|---|---|---|---|---|---|---|
| 72° | 110° | 125° | 132° | 1 hr 41 mins | In Progress | 2:48pm |

USERS check who you want to recieve alerts
lead John Doe

- ☐ Sam Smith
- ☒ Bob Johnson
- ☒ Thomas Dean
- ☐ Frank Williams
- ☒ Luke Jones

Location
3625 Interlake Ave N.
Seattle, WA. 98103

[Search] [Confirm]

ZAPP BUG™

NOTES:

Upload images and files (20MB) max
- image_01.jpg   view
- image_02.jpg   view

[ Upload ]

[ Submit ]

Add New Tag:
[          ]  [ Add ]

[ Hotel ]  [ 2-circuits ]  [ 2 twins beds ]  [ Best Western ]

HISTORY

Alert Log
Treatment Started                 12:26pm
Estimated time 3hrs 42mins        12:27pm View More

| Air temp | Probe 1 | Probe 2 | Probe 3 | ETA | Status | Time |
|---|---|---|---|---|---|---|
| 72° | 100° | 102° | 111° | 2 hr 22mins | In Progress | 2:04pm |

*Fig. 36*

HISTORY

| Air temp | Probe 1 | Probe 2 | Probe 3 | ETA | Status | Time |
|---|---|---|---|---|---|---|
| 72° | 100° | 102° | 111° | 2 hr 22mins | In Progress | 2:04pm |
| 73° | 90° | 95° | 88° | 2 hr 43mins | In Progress | 1:32pm |
| 72° | 78° | 82° | 71° | 3 hr 12mins | In Progress | 12:57pm |

Load More ∨

Export

*Fig.37*

HEATING CHAMBER SYSTEM AND METHOD FOR INSECT EXTERMINATION

CROSS-REFERENCE TO RELATED APPLICATIONS

This application is a non-provisional of and claims the benefit of U.S. Provisional Application No. 62/171,163 filed Jun. 4, 2015, which application is hereby incorporated herein by reference in its entirety and for all purposes.

BACKGROUND

Heat treatment is a common method used to kill insects. It is particularly useful for bed bug infestations because bed bugs are resistant to many of the chemicals commonly used by pest control professionals. The exact temperatures and times required to successfully heat treat bed bugs varies, but one example treatment is to heat items to 120 F and then hold that temperature for 10-60 minutes. However, a range of temperatures and times are commonly accepted for bed bug heat treatment.

Conventional systems are deficient because they are not sufficiently portable, easy to setup and/or lack the ability to adequately treat a wide variety of items that may be infested by insects such as bed bugs.

In view of the foregoing, a need exists for an improved heating chamber system and method for insect extermination in an effort to overcome the aforementioned obstacles and deficiencies of conventional insect extermination systems.

BRIEF DESCRIPTION OF THE DRAWINGS

FIG. 1 is an exemplary perspective drawing illustrating an embodiment of a heating chamber system.

FIG. 2 is an exemplary perspective drawing illustrating an embodiment of a heating chamber system comprising a heating assembly.

FIG. 4a is an exemplary perspective drawing illustrating an embodiment of a heating assembly.

FIG. 4b is an exemplary perspective drawing illustrating the heating assembly of FIG. 4a.

FIG. 5a is an exemplary close-up perspective drawing illustrating an embodiment of a heating assembly.

FIG. 5b is an exemplary cutaway side-view drawing illustrating a portion of the heating assembly of FIG. 5a.

FIGS. 5c and 5d illustrate an example embodiment of a heating assembly wherein at least one mesh strip defines a portion of a length of a heating tube.

FIG. 8 illustrates a passively inflatable wall in accordance with one embodiment.

FIG. 10 is an exemplary perspective drawing illustrating the heating assembly and couch of FIG. 9a.

FIG. 11 is an exemplary perspective drawing illustrating the heating assembly and couch of FIG. 9a.

FIG. 12a is an exemplary perspective drawing illustrating the heating assembly and couch of FIG. 9a.

FIG. 12b is an exemplary perspective drawing illustrating the heating assembly and couch of FIG. 9a.

FIG. 15 is an exemplary perspective drawing illustrating an embodiment of a heating panel.

FIG. 16a is an exemplary perspective drawing illustrating another embodiment of a heating panel being used to treat a couch.

FIG. 16b is another exemplary perspective drawing illustrating the heating panel and couch of FIG. 16a.

FIG. 17 is an exemplary perspective drawing illustrating an embodiment of a heating chamber system.

FIG. 18 is an exemplary perspective drawing illustrating the heating chamber system of FIG. 1 with the top portion removed.

FIG. 19 is an exemplary perspective drawing illustrating the heating chamber system of FIGS. 1 and 18 with the top portion and architecture removed.

FIG. 21 is a graph that illustrates how increasing the rate of heating within a heating chamber can shorten the time it takes to reach a lethal treatment temperature within the heating chamber.

FIGS. 22a and 22b illustrate a first and second configuration of power cords assemblies being operably coupled with two or three separate electrical circuits via two or three power outlets.

FIGS. 31, 32, 33, 34, 35, 36 and 37 illustrate further examples of interfaces that can be presented on a control system interface or user device.

Figure 3A:
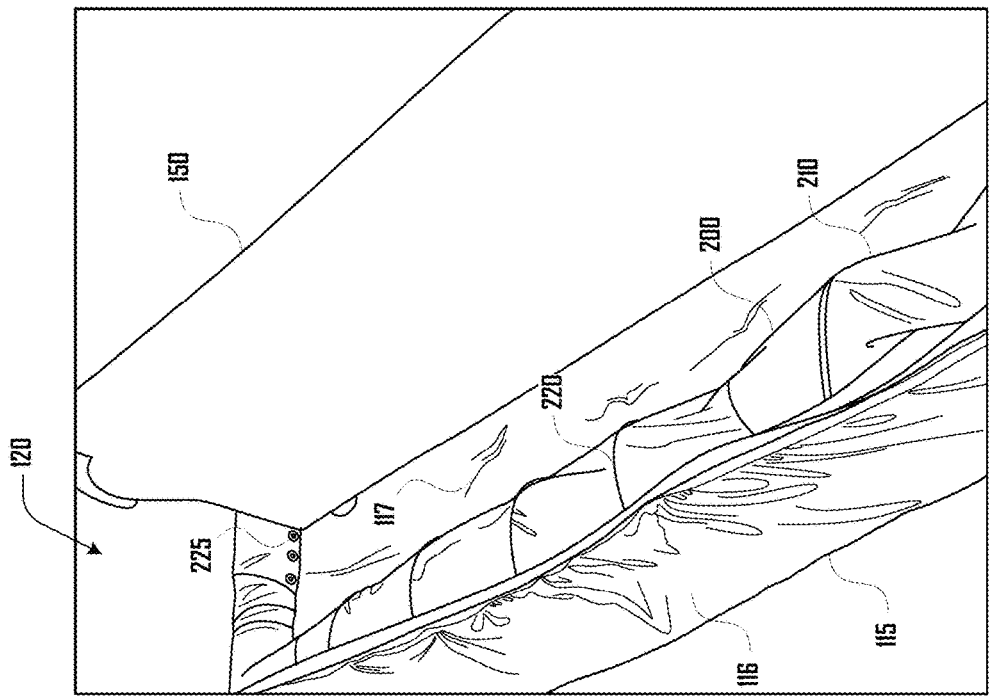
FIG. 3a is an exemplary close-up drawing illustrating a portion of the heating chamber system of FIG. 2.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available insect extermination systems are deficient, a heating chamber that provides for extermination of insects can prove desirable and provide a basis for a wide range of applications, such as portability of the system, easy assembly and disassembly of the system, and treatment of wide variety of objects of a wide variety of sizes. This result can be achieved, according to one embodiment disclosed herein, by a heating chamber system 100 as illustrated in FIG. 1.

Turning to FIG. 1, the heating chamber system 100 is shown as comprising a tent 105 having a top portion 110 and a bottom portion 115. The top portion 110 comprises a plurality of sidewalls 111, a roof 112, and a roof skirt 113. The bottom portion 115 comprises a floor skirt 116 and a floor 117. The top portion 110 and bottom portion 115 collectively define a chamber 120. For purposes of illustration, various examples of the chamber system 100 herein are illustrated with a portion of the top portion 110 removed (e.g., one or more sidewalls 111). For example, FIG. 18 illustrates the heating chamber system 100 of FIG. 1 with the top portion 110 removed. However, it should be clear that in various embodiments, the chamber 120 can comprise a substantially enclosed space that is surrounded by the top and bottom portions 110, 115.

The tent 105 is supported by an architecture 125 that comprises a plurality of poles 126 and a plurality of headers 127. In various embodiments, the architecture 125 can comprise any suitable rigid materials including metal, a plastic, wood, carbon fiber, or the like. In further embodiments, the architecture 125 can be collapsible and/or configured for disassembly. For example, the architecture 125 can comprise various fittings that couple the poles 126 and headers 127. In some embodiments, the poles 126 and/or headers 127 can be collapsible along their length. In further embodiments, the tent 105 can be erected via any suitable system, which may or may not include the architecture 125. For example, in some embodiments, erection of the tent 105 can comprise suspension via ropes or lines, erection via inflatable members in the tent 105, or the like. Additionally, as shown in FIGS. 1 and 18, the headers 127 can comprise a collapsible lattice structure and structures on which the top portion 110 can be coupled such a rings or the like.

Although various embodiments shown and described herein comprise a heating chamber system 100 having a cuboid shape, this should not be construed to be limiting on the numerous other shapes of a chamber system 100 that are within the scope and spirit of the present invention. For example, in further embodiments, the heating chamber 120 can be spherical, hemispherical, cylindrical, ovoid, a polyhedron, a frustum, or the like.

Additionally, the example configurations of the tent 105 and portions of the tent 105 should not be construed to be limiting on the many variations that are within the scope and spirit of the present invention. For example, in some embodiments, one or both of the skirts 116, 113 can be absent and the walls 111 can extend to the floor 116 and/or roof 112.

In some embodiments, the top and bottom portions 110, 115 can be detachably coupled in any suitable way during operation, including Velcro, a zipper, snaps, hook-and-loop, or the like. However, in other embodiments, the top and bottom portions 110, 115 do not need to be coupled and can merely reside adjacent to one another.

Furthermore, various embodiments can comprise a chamber system 100 of any suitable size, including a chamber system 100 configured for treating small objects (e.g., a hair brush or wallet); medium sized objects (e.g., clothing, luggage, purse or backpack); large objects (e.g., furniture); and extra-large objects (e.g., vehicles, and the like).

Figure 20A:
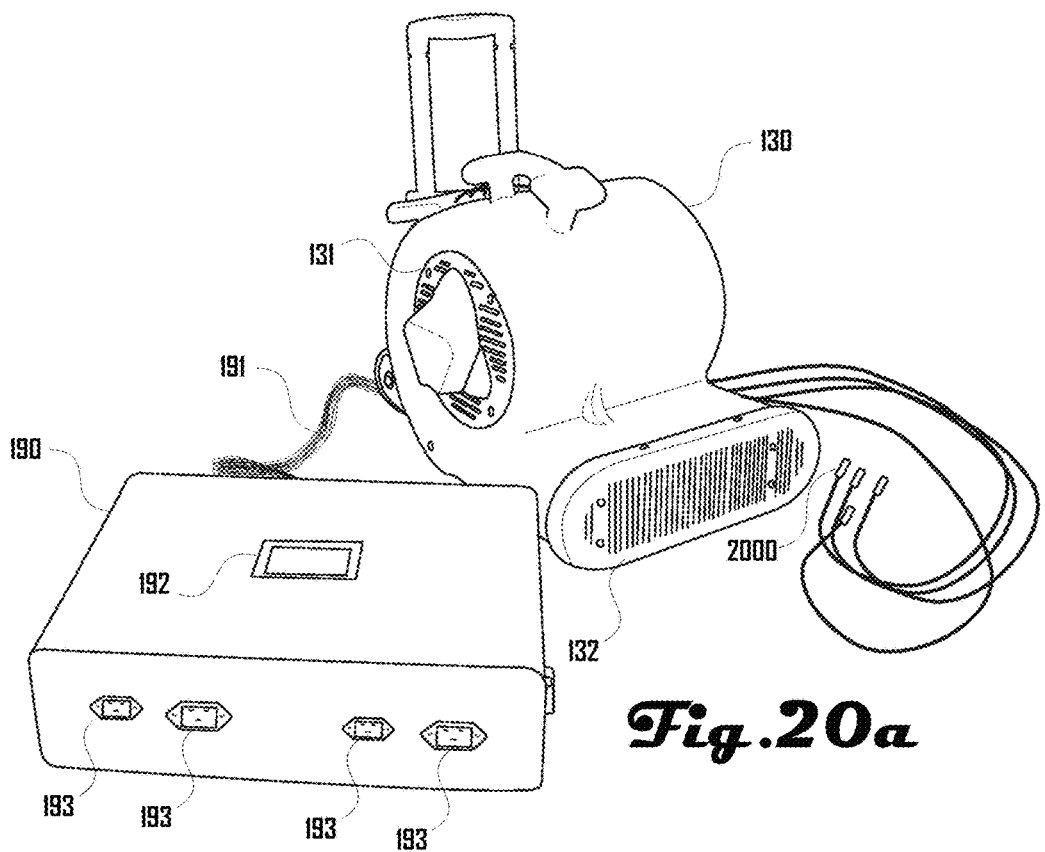
FIG. 20a illustrates and embodiment of a heater, control system and sensors in accordance with an embodiment.
Figure 20B:
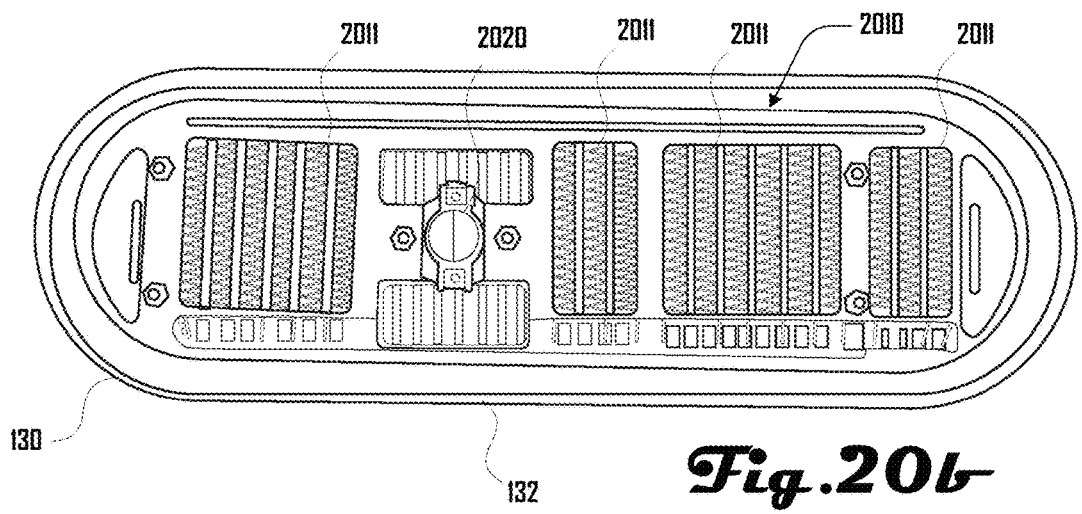
FIG. 20b illustrates an embodiment of a heater face in accordance with an embodiment.

As described in more detail herein, the heating chamber system 100 can comprise one or more heaters 130 that are configured to introduce heat into the chamber 120, which can be used to treat various items 150 that are present within the chamber 120. In various embodiments, the one or more heaters 130 can be configured to be external and/or internal to the chamber 120. For example, FIGS. 1, 18 and 19 illustrate an example heating chamber system 100 comprising one heater 130 disposed within the chamber 120, whereas FIG. 17 illustrates an example system 100 comprising two heaters 130 disposed external to the chamber 120. In some embodiments, the heater 130 can comprise a fan that generates positive air pressure and drives heated air as discussed herein (e.g., as illustrated in FIGS. 20a and 20b). However, in other embodiments, one or more fan can be external to, and associated with, one or more heater 130.

The one or more heater 130 can be controlled in various suitable ways. For example, a controller 190 can be operably coupled to the heater 130 via a line 191. In some embodiments, the controller 190 can be disposed external to the chamber 120, which may be desirable because components of the controller 190 can be heat sensitive or at least can have a longer operating life if not directly exposed to heat generated within the chamber 120. Accordingly, in various embodiments, the line 191 can extend into the chamber 120 (e.g., extend through the skirt 116 of the base portion 115 as illustrated in FIGS. 18 and 19).

In various embodiments, the controller 190 can comprise an interface 192 that allows users to program or otherwise interact with the controller 190, which in turn can allow users to control the heating chamber system 100. The interface 192 can include any suitable interface display and/or controls including a touch-screen, one or more buttons, or the like. Power can be provided to the controller and/or heater 130 in various suitable ways, including via one or more controller power input receptacles 193 as described in more detail herein. Control of the one or more heaters 130 via the controller 190 is also discussed in more detail herein.

Figure 3B:
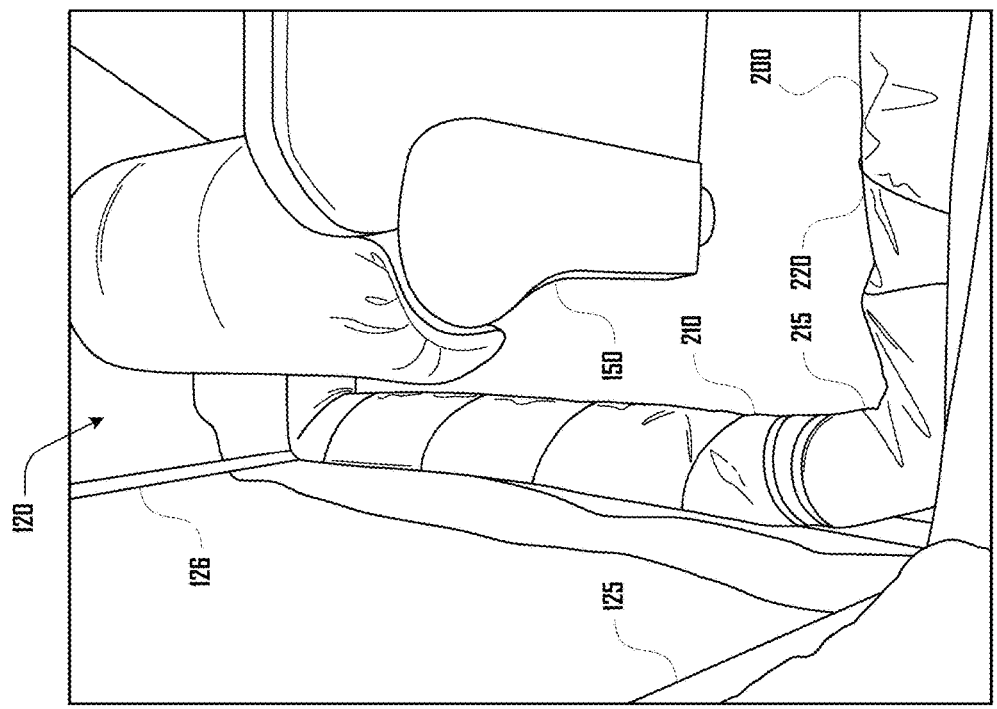
FIG. 3b is another exemplary close-up drawing illustrating a portion of the heating chamber system of FIG. 2.

FIGS. 1, 2, 3a, 3b, 4a, 4b, 5a, 5b, 18 and 19 illustrate example embodiments of a heating assembly 200 configured to introduce heated air into the chamber 120. The heating assembly 200 can comprise a heating tube 205 that comprises a plurality of elongated cylindrical linear portions 210 and corner portions 215 that are configured to correspond to an edge of the floor 117 and against an internal face of the floor skirt 116. Accordingly, in various embodiments, the heating tube 205 can be configured to run along a portion of the perimeter of the floor 117 as shown in FIGS. 2, 3a, 3b.

In one embodiment, as illustrated in FIGS. 4a and 4b, the heating assembly 200 can comprise a heater 130 that is coupled to an end of the heating tube 205 at a first linear portion 210A. The first linear portion 210A is coupled to a second linear portion 210B via a first corner 215A, and the second linear portion 210B is coupled to a third linear portion 210C via a second corner 215B. The third linear portion 210C is coupled to a fourth linear portion 210D via a third corner 215C. The fourth linear portion 210D defines a terminal end 235 of the heating tube 205.

The heating tube 205 can define a cavity 240 (shown in FIG. 5b) that extends from the heater 130 to the terminal end 235, which is configured to accept and contain hot air from the heater 130. Such hot air can be driven by one or more fans to generate a positive pressure within the cavity 240. In some embodiments, such a positive pressure can serve to inflate the heating tube 205.

Alternatively and/or in addition, the heating tube 205 can comprise a flexible material (e.g., fabric, metal, plastic, or the like) that maintains shape via a form 220. For example, as shown in FIGS. 4a and 4b, in some embodiments, the form 220 can comprise a rigid coil that surrounds the heating tube 205 along the length of the heating tube 205. In some embodiments, the form 220 may or may not be present on and/or around the corners 215. Accordingly, in various embodiments, the corners 215 can be rigid, semi-rigid or non-rigid.

Hot air can be generated by the heater 130 and introduced into the cavity 240 of the heating tube 205, where such hot air can exit the cavity 240 of the heating tube 205 via ports 225, 230. As shown in detail in FIGS. 5a and 5b the heating tube 205 can comprise a plurality of inwardly facing ports 225 disposed in rows linearly along a portion of the linear portions 210. In some embodiments, there can be a row of lateral ports 225A and a row of angled ports 225B.

For example, as illustrated in FIG. 5b, in some embodiments, the lateral ports 225 can be configured to be aligned along an axis X that is substantially parallel to an axis G, which is coincident with the floor of 117 of the bottom portion 115. The angled ports 225B can be disposed at an angle θ from the lateral ports 225A. Such a configuration can be desirable so that hot air can be projected laterally into the chamber 120 of the system 100 to provide even and uniform heating within the cavity 120.

Additionally, the corner portions 215 can comprise one or more corner ports 230, which can be configured to direct air upward toward the roof 112, toward the walls 111 and/or within the chamber 120. For example, referring to FIG. 5b, in some embodiments, the corner ports 230 (not shown in FIG. 5b) can direct air at an angle that is about 90° from axis X, greater than 90°, or less than 90°.

The ports 225, 230 can comprise any suitable structure that facilitates air passing out of the heating tube cavity 240. For example, in one preferred embodiment, the ports 225, 230 can comprise a grommet that defines a hole in the body of the heating tube 205. In some embodiments, ports 225, 230 can maintain a fixed size or air transmission rate. However, in some embodiments, the size or air transmission rate of ports 225, 230 can be selected to provide for increased air flow, decreased airflow, or no airflow.

The example configuration of ports 225, 230 shown herein should not be construed to limit the wide variety of configurations of ports 225, 230. For example, in various embodiments, there can be any suitable plurality of ports arranged in any desirable positions or configuration on the heating tube 205.

In further embodiments, as illustrated in FIGS. 5c and 5d such ports or an air transmission zone 510 can be defined by a porous, mesh or otherwise air-transmissive material disposed within or on a portion of the heating tube 205. For example, FIGS. 5c and 5d illustrate an example embodiment wherein at least one mesh strip 515 defines a portion of a length of the heating tube 205 (e.g., a mesh fabric sewn into the body of the heating tube 205).

Figure 6A:
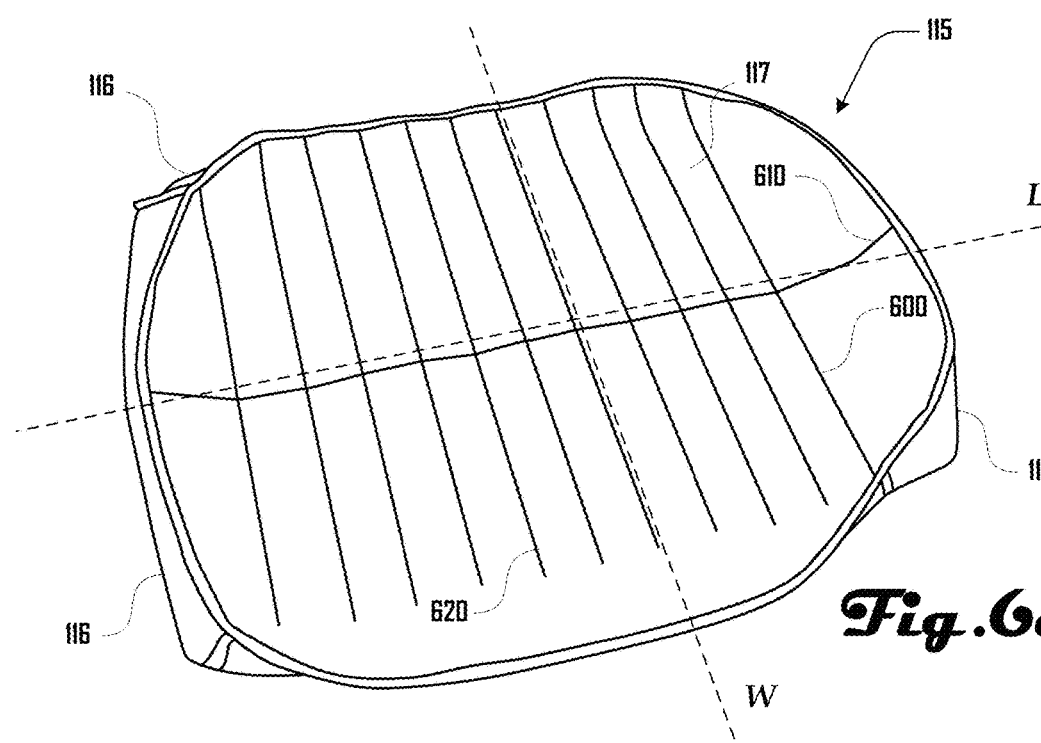
FIG. 6a is an exemplary perspective drawing illustrating an embodiment of a bottom portion of a heating assembly.

Turning to FIGS. 6a, 6b and 7a-c, in various embodiments, the bottom portion 115 can be foldable and/or or provide for air flow about the bottom portion 115. For example, as shown in FIG. 6a the bottom portion 115 can comprise a plurality of seams 600. In this example embodiment, there can be a central seam 610 that is disposed along a length axis L, with a plurality of column seams 620 that extend along a width axis W that can be substantially perpendicular to the length axis L.

Figure 6B:
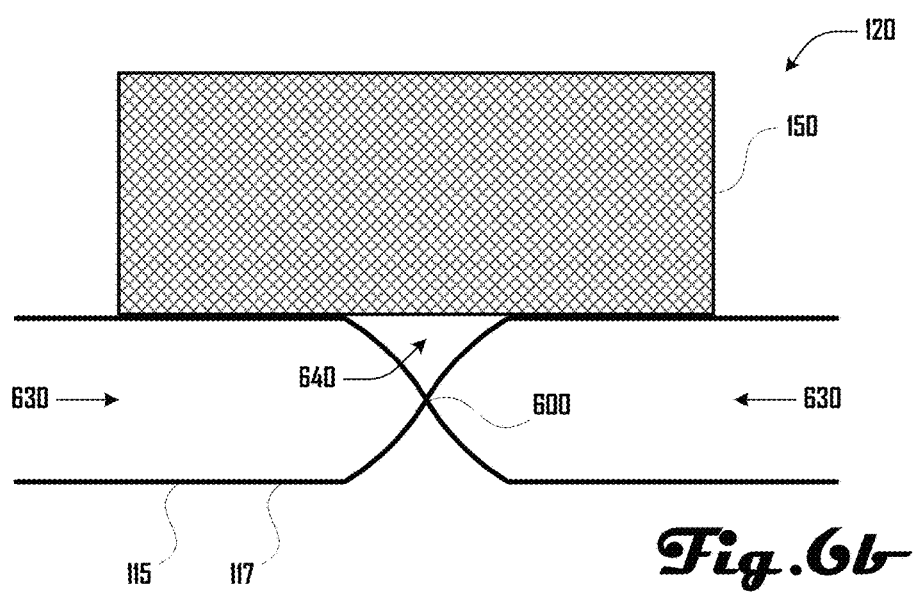
FIG. 6b is an exemplary cutaway side-view drawing illustrating a portion of the bottom portion of FIG. 6a having an object disposed thereon.

As illustrated in FIG. 6b, the seams 600 can define a valley region 640 that provides for air flow under and around an object 150 that is disposed on the floor 117 of the bottom portion 115. Providing for such air flow can be desirable so that portions of an object 150 and/or portions within the chamber 120 are not isolated from or insufficiently exposed to heated air. Accordingly, valley regions 640 can provide for uniform heating of objects 150 within the chamber 120 by providing a space where hot air can travel under objects 150 resting on the floor 117.

Figure 7A:
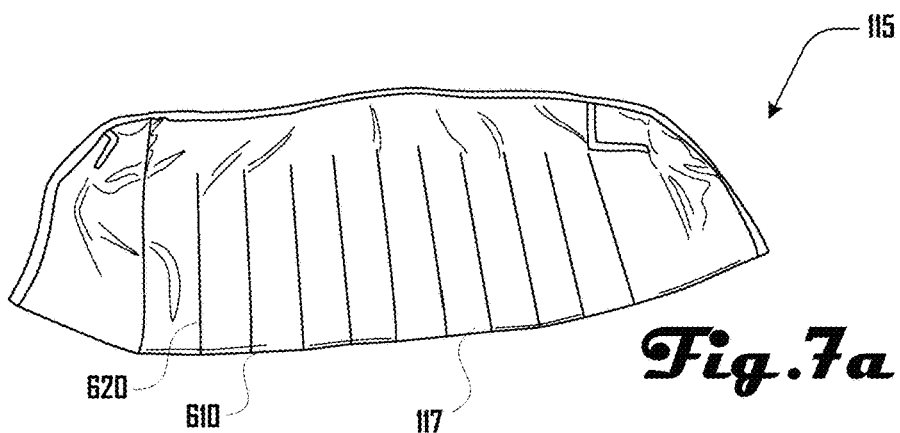
FIG. 7a is an exemplary perspective drawing illustrating the bottom portion of FIG. 6a in a first folded configuration.
Figure 7B:
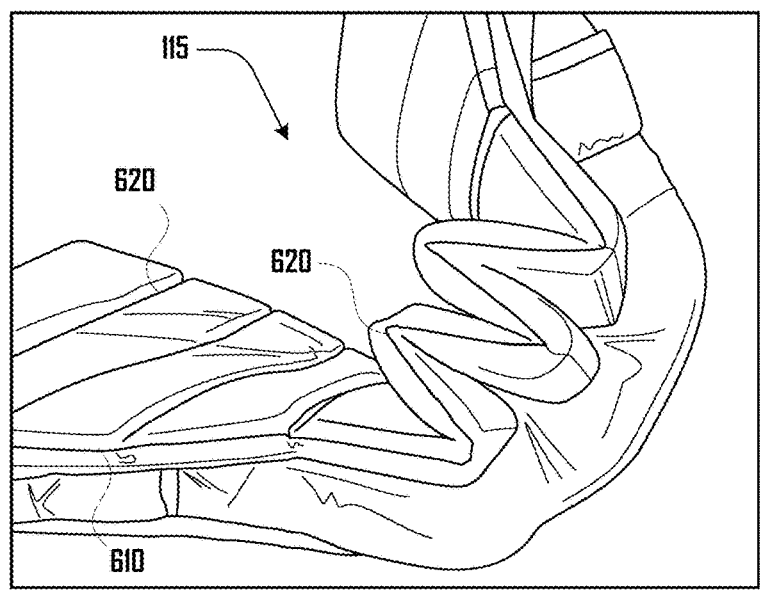
FIG. 7b is an exemplary perspective drawing illustrating the bottom portion of FIG. 7a in a second folded configuration.
Figure 7C:
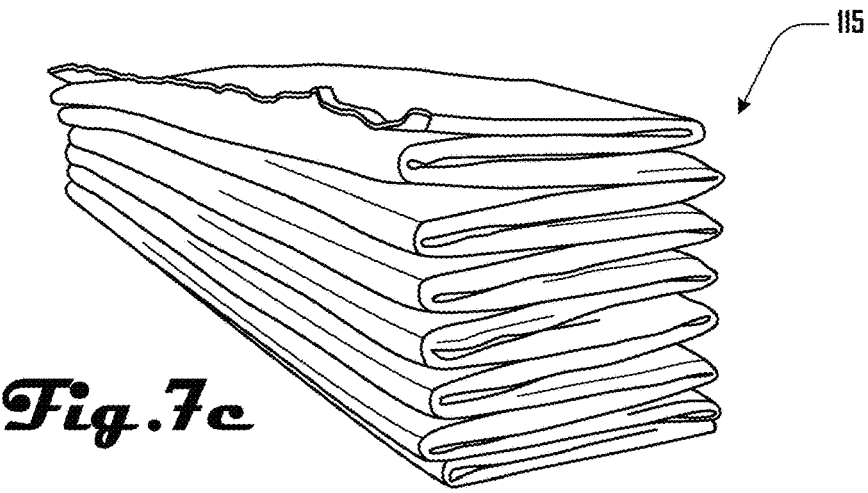
FIG. 7c is an exemplary perspective drawing illustrating the bottom portion of FIGS. 7a and 7b in a third folded configuration.

Additionally, the seams 600 can be desirable because the seams can provide for folding of the bottom portion 115. For example, as illustrated in FIG. 7a, the bottom portion 115 can be folded in half via the central seam 610 and then folded along the column seams 620 as shown in FIG. 7b to generate a stacked configuration of the bottom portion 115. Providing for a folded or stacked configuration of the bottom portion 115 can be desirable for portability of the heating chamber system 100.

The tent 105 and heating assembly 200 can comprise various suitable materials, including canvas, nylon, insulating foam, vinyl and the like. In some embodiments, parts such as the top portion 110, bottom portion 115 and/or heating tube 205 can comprise a single layer of material or can comprise various suitable layers and/or cavities. For example, in some embodiments, the top portion 110, bottom portion 115 and/or heating tube 205 can be inflatable and/or comprise insulation.

In one example embodiment, as illustrated in FIG. 8, a wall of the tent 105 can comprise an air cavity 800 that provides air to an inflatable cavity 840. In this example, non-air-permeable material 810, 820 can define the air cavity 800 and a semi-air-permeable material 830 can define the inflatable cavity along with a wall portion 820 of the non-air-permeable material coupled thereto at seams 825. When a positive air pressure is applied within the chamber 800, air 830 can enter the inflatable cavity 840 to inflate the inflatable cavity 840 as illustrated in FIG. 8. Such a passive inflation configuration can be beneficial because the inflatable cavity 840 can act as an insulator.

Additionally and/or alternatively, various portions can be actively inflated. For example, air can be directed into non-air-permeable cavities to inflate such cavities, which may be desirable for purposes of insulation and/or structural support.

As discussed herein, exposing items 150 disposed with the chamber 120 to heated air for a certain period of time and at a certain temperature can kill insects such as bed bugs that may be residing within the objects 150. Some objects, or arrangements of objects 150, are more conducive to uniform heating within the chamber 120, which can increase the efficacy of such heat treatment. However, other objects 150 or arrangements of objects 150 are not conducive to uniform heating within the chamber 120, which may be due to thickness, presence of air cavities, or the like.

Accordingly, when treating such objects 150, additional heading structures or elements can be desirable. For example, FIGS. 9a, 9b, 10, 11, 12a, 12b, 13a, 13b, 14a, 14b illustrate a heating assembly 200 that comprises a heating branch assembly 900 that includes a manifold 910 coupled to the heater 130 and/or heating tube 205, which communicates air from the heater to a branch tube 915. The branch tube 915 can comprise a tube body 916 that includes a flexible sheet material and a rigid form 917 that provides shape to the tube body 916. In various embodiments, the rigid form 917 can comprise a coil.

The elongated branch tube 915 can extend from the manifold 910 to a cap end 918 (shown in FIGS. 10 and 11). Accordingly, heated air from the heater 130 can enter and be held by the branch tube 915. In various embodiments, the branch tube 915 can comprise a plurality of ports (not shown) that allow for the heated air to escape from the branch tube 915 and into the chamber 120. In further embodiments, the tube body 916 can comprise an air-permeable material that allows air to escape from the branch tube 915 and into the chamber 120. In some embodiments, the diameter of the branch tube 915 can narrow from the manifold 910 to the end 918, which can be desirable to provide a constant velocity output.

For objects 150 where direct application of heat is desired, the branch tube 915 can be selectively folded or laid in such objects 150 to provide more direct exposure to heated air. For example, FIGS. 9a, 9b, 10, 11, 12a, and 12b illustrate an example of the branch tube 915 being routed through a couch. More specifically, the branch tube 915 is shown being routed under and/or over couch cushions such that heated air is directly applied to portions of the couch where heated air might have more difficulty penetrating without application of the branch tube 915. In further examples, FIGS. 13a, 13b, 14a, 14b illustrate the branch tube 915 being routed in and about a suitcase and/or other objects such as pillows and clothing.

In further embodiments, the heating assembly 200 can comprise a plurality of branch tubes 915, which can originate from one or more manifolds 910 located in any desirable position in the heating assembly 200. For example, although the example embodiment of FIG. 9a comprises a manifold 910 that is positioned proximate to or coupled with the heater 130, in further embodiments, one or more manifolds 910 can be coupled at any desired position on the heating tube 200 or the branch tube 915 can be associated with a separate heater 130.

In further embodiments, various other structures can be implemented to provide for more direct application of heated air. For example, FIG. 15 illustrates a heating panel 1500 that comprises a panel body 1505 that defines a plurality of panel ports 1510. The heating panel 1500 can be positioned over, in, or about various objects 150 so that heated air can be directed to such objects 150. As illustrated in FIG. 15, the heating panel 1500 can receive air 1515 from a heater 130 (not shown in FIG. 15), and the air 1520 can be expelled from the ports 1510 into or onto the objects 150.

Figure 9A:
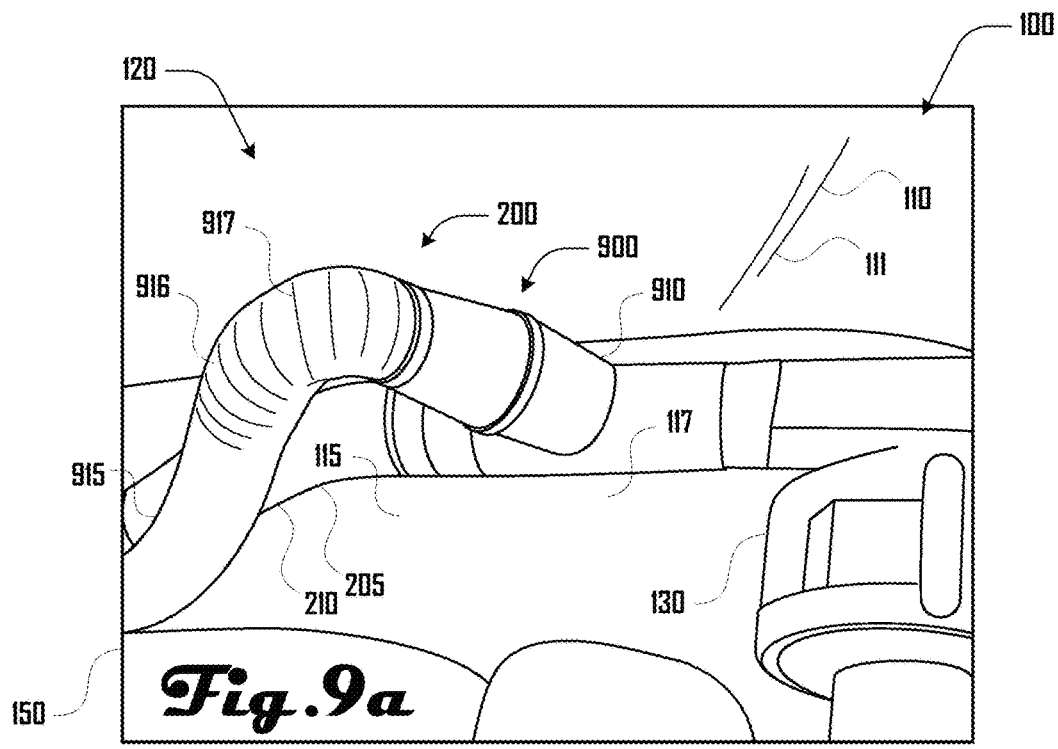
FIG. 9a is an exemplary perspective drawing illustrating a portion of another embodiment of a heating assembly.
Figure 9B:
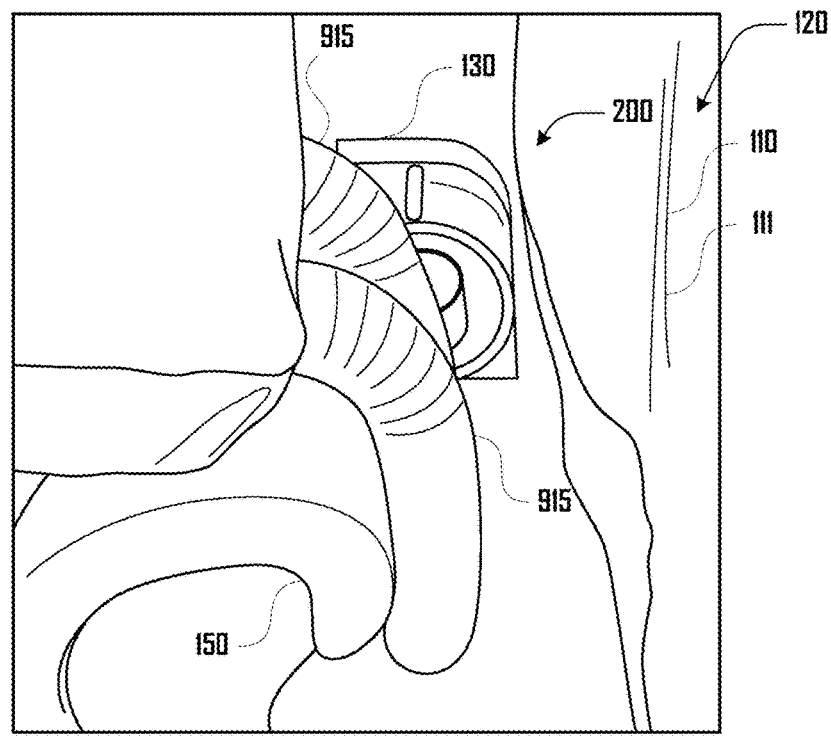
FIG. 9b is an exemplary perspective drawing illustrating the heating assembly of FIG. 9a being used to treat a couch.
Figure 12B:
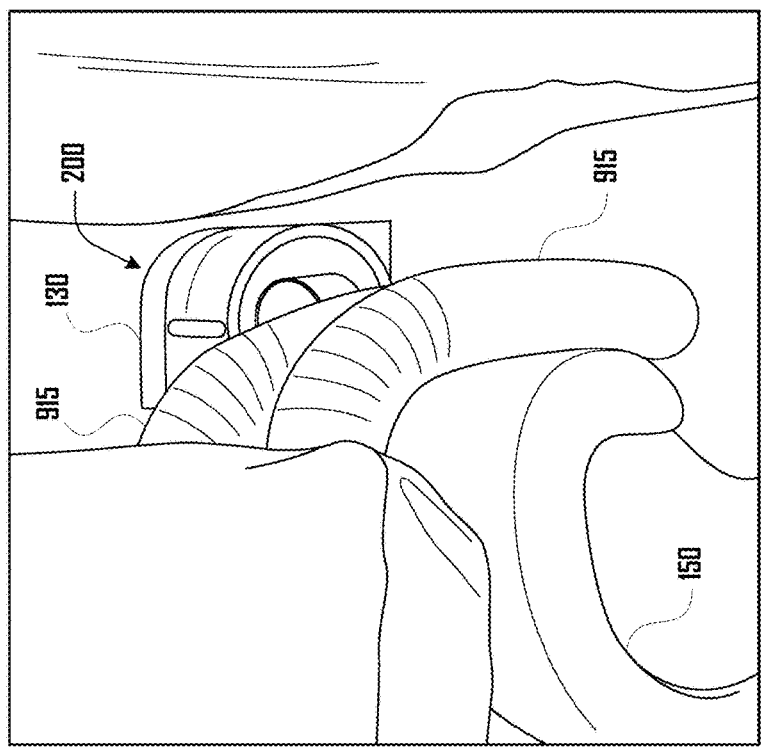
Figure 12A:
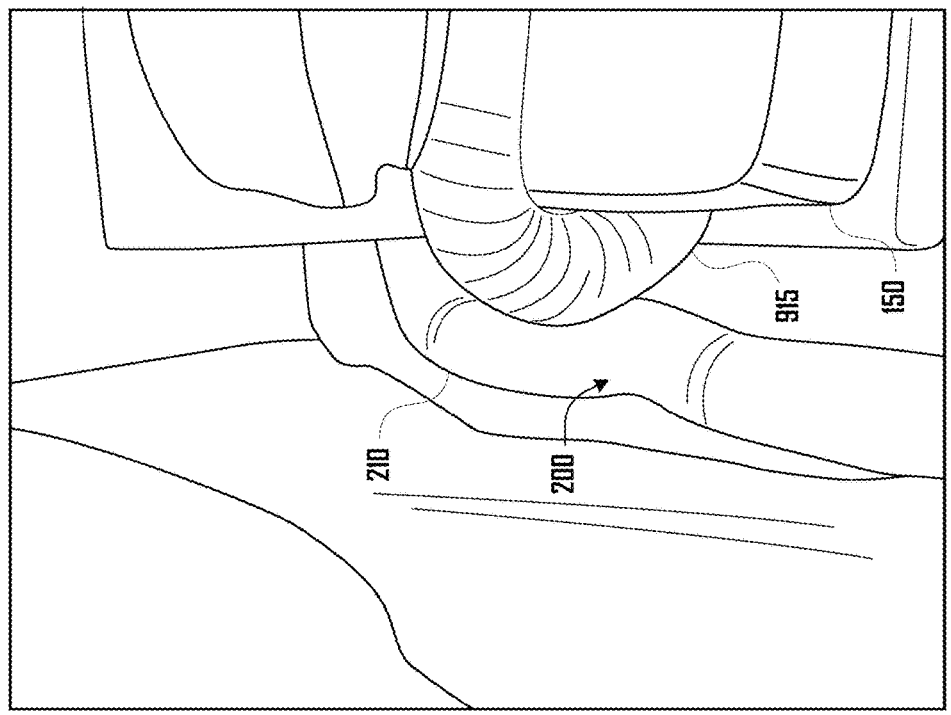
Figure 13A:
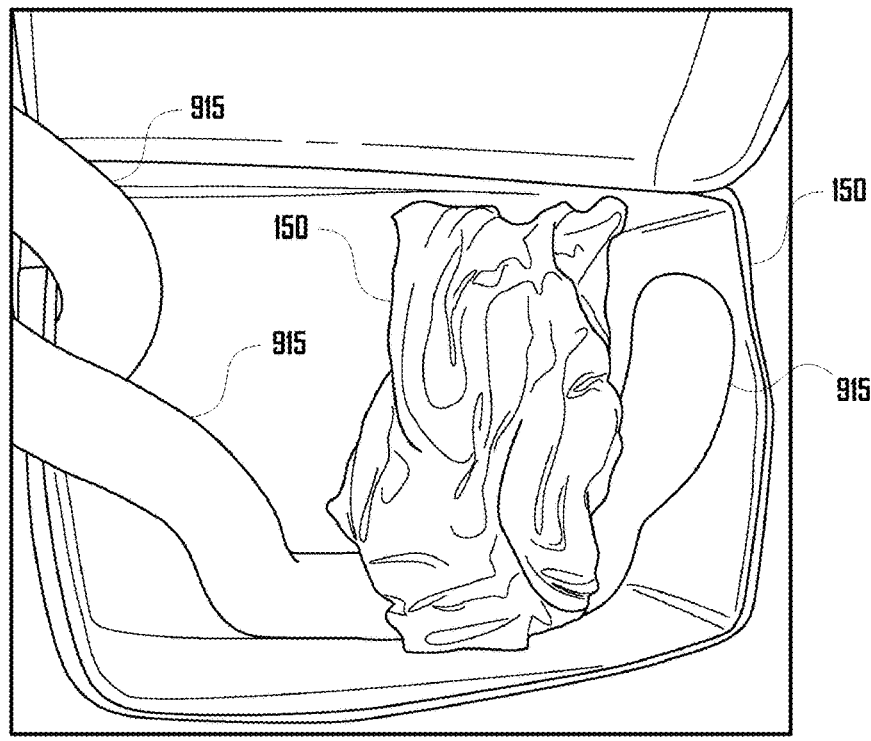
FIG. 13a is an exemplary perspective drawing illustrating the heating assembly of FIG. 9a being used to treat a suitcase and clothing.
Figure 13B:
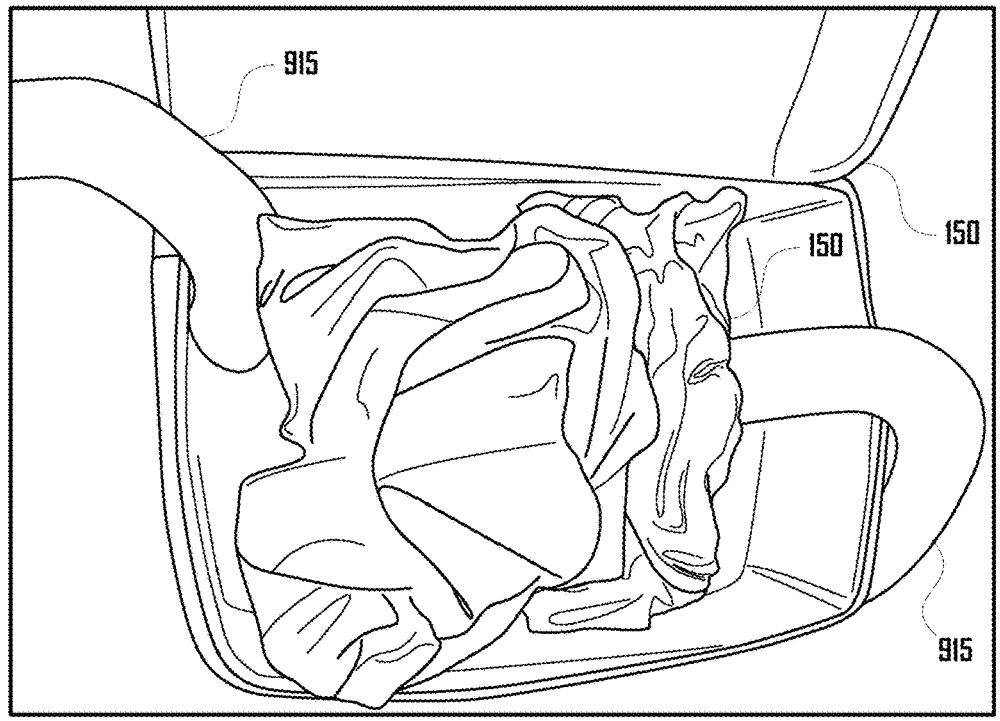
FIG. 13b is an exemplary perspective drawing illustrating the heating assembly of FIG. 9a being used to treat a suitcase and clothing.
Figure 14A:
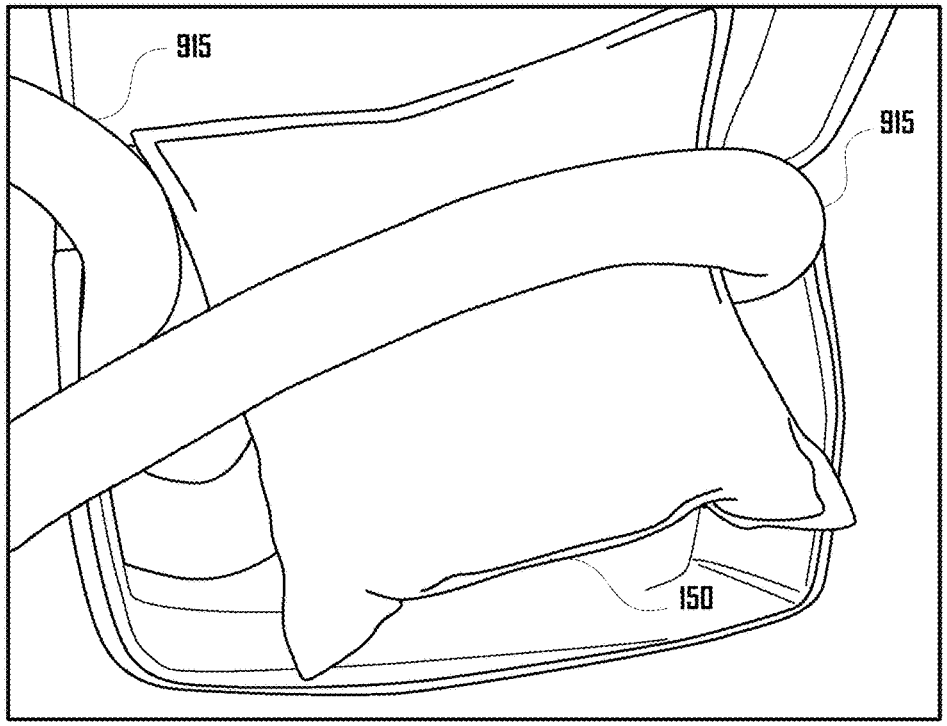
FIG. 14a is an exemplary perspective drawing illustrating the heating assembly of FIG. 9a being used to treat a suitcase and a pillow.
Figure 14B:
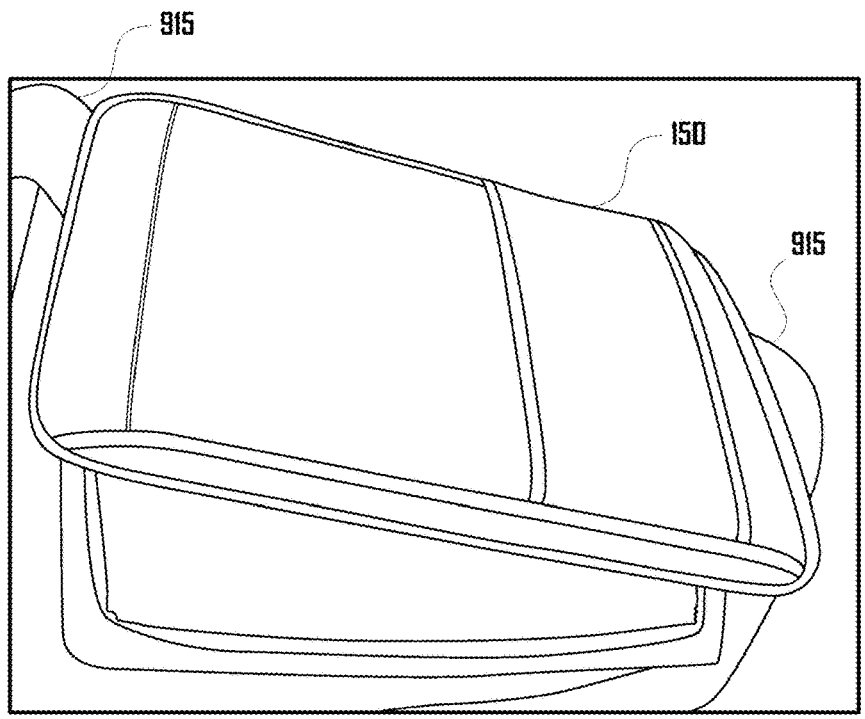
FIG. 14b is an exemplary perspective drawing illustrating the heating assembly of FIG. 9a being used to treat a suitcase with the lid closed.

In various embodiments, the panel body 1505 can be rigid and/or flexible. For example, FIG. 15 illustrates a rigid heating panel 1500, whereas FIGS. 16a and 16b illustrate a flexible heating panel 1500. In various embodiments, the panel body 1505 can be a substantially planar body of any suitable size and shape. The heating panel 1500 can be connected to a heater 130 directly, via a flexible tube, or the like. In some embodiments, the heating panel can be associated with a heater 130 via a manifold as illustrated in FIG. 9a. In some embodiments, ports 1510 can be solely located on a single face of the panel body 1505 as shown in FIG. 15, but in further embodiments, ports can be on any suitable surfaces of the panel body 1505. In further embodiments, there can be any suitable number of ports 1510 or ports 1510 can be absent and the panel body 1505 can comprise an air-permeable material that allows air to leave the panel body 1505. In still further embodiments, in addition or alternatively, the heating panel 1500 can comprise an electrical restive heater.

Turning to FIGS. 20a and 20b, the heater 130 can be operably coupled with the controller 190 via a line 191. The heater 130 can comprise one or more air intake vents 131, which as illustrated in FIG. 20a can be positioned on a side of the heater 130. Air can be drawn into the heater 130 via a fan system disposed within the heater 130, and passed through heating elements 2011 of a heating array 2010 and out of an outlet vent 132 of the heater 130. In other words, the heater 130 can generate heated air by sucking air in the intake vents 130, and passing the air out the outlet vent 132 through the heating array 2010 to heat the air.

In some embodiments, the heater 130 can comprise various control and/or safety mechanisms. For example, FIG. 20b illustrates an example heating array 2010 that comprises a safety thermostat 2020 that can be configured to trigger a power shutoff at the heater 130 and/or control system 190 if an unsafe temperature is detected, which is above a safety threshold. Accordingly, one or more heaters 130 can be configured to heat the chamber 120 of a heating chamber system 100 and treat items 150 disposed within the chamber 120 within desired temperature ranges, which can be controlled via software and/or hardware at any of the heater 130, control system 190, a user device, or the like.

In various embodiments, it can be desirable for a heating chamber system 100 to be configured to minimize total treatment time. One factor that affects heat transfer (heating up items) is temperature difference—the temperature difference between the hot working fluid (e.g., air) and the cold item being treated. The larger the temperature difference, the faster the heat transfer. Accordingly, in some embodiments, the heating chamber system 100 can be configured to increase its internal air temperature as fast as possible to a target maximum temperature.

For example, FIG. 21 illustrates a graph 2100 having a lethal temperature threshold 2110 and maximum chamber temperature threshold 2120. The maximum temperature threshold 2120 can be defined as a maximum safe temperature above which items 150 being treated within the chamber 120 could be damaged. The lethal temperature threshold 2110 can be defined as a temperature at which a target organism (e.g., bed bugs) will be killed if exposed to the lethal temperature threshold 2110 for a defined treatment time within the chamber 120.

FIG. 21 illustrates two example treatment scenarios, with the first scenario being illustrated by black lines depicting internal chamber temperature 2130 and item temperature 2135, and the second scenario being illustrated by dashed and dotted lines illustrating internal chamber temperature 2140 and item temperature 2145. In the first scenario, as internal chamber temperature 2130 rises, item temperature 2135 also rises until the items reach the lethal temperature threshold 2110 at time $T_1$, illustrated by line 2138.

In contrast, in the second scenario, the internal chamber temperature 2140 increases more rapidly than the internal chamber temperature 2130 of the first scenario, which accordingly raises the item temperature 2145 in the second scenario faster than the item temperature 2135 in the first scenario. Given the more rapid increase, the item temperature 2145 reaches the lethal temperature 2110 faster at time $T_1$, illustrated by line 2148. FIG. 21 therefore illustrates that increasing the rate of temperature increase within the chamber 120, the items 150 being treated in the chamber 120 can reach the lethal temperature 2110 faster, which can reduce treatment time an amount illustrated by $\Delta T$.

Accordingly, in various embodiments, it can be desirable to raise the temperature in the chamber 120 as fast as possible so as to minimize treatment time. However, in some embodiments, a limitation to heating air within the chamber 120 can be the amount of power that can be consumed from an electrical circuit that powers heaters 130, fans, or the like. In some embodiments, a plurality of independent electrical circuits can be employed to power the heating chamber system 100, but in various settings, access to a plurality of independent circuits is limited by the number of receptacles associated with individual circuits that are available within reach of a location within a building.

In some embodiments, the heating chamber system 100 can be configured to work with one or more individual circuits (e.g., two or fewer circuits; three or fewer circuits; exactly two circuits, exactly three circuits, or the like). For example, FIG. 22a illustrates an example embodiment of a controller 190 consuming power from two circuits 2250 and FIG. 22b illustrates an example embodiment of the controller 190 consuming power from three circuits 2250.

As shown in FIGS. 22a and 22b, in various embodiments, the controller 190 can receive power via a plurality of controller power input receptacles 193, which in some embodiments can be four power input receptacles 193 as illustrated in this example. The four power input receptacles 193 can be configured to couple with one or more power outlets 2250 via a power cord assembly 2205 that includes a cord 2206 and a plug 2207. Having four separate power input receptacles 193 can be desirable because it can provide for the heating chamber system 100 coupling with and obtaining power from various suitable pluralities of separate electrical circuits.

In the example of FIGS. 22a and 22b, three separate electrical circuits are illustrated (labeled Circuit 1, Circuit 2, Circuit 3), with each separate circuit being associated with a power outlet 2250 having two receptacles 2251, which are configured to couple with a plug 2207 of a power cord assembly 2205. In FIG. 22a, the two power cord assemblies 2205 are plugged into the first outlet 2250A associated with "Circuit 1"; two power cord assemblies 2205 are plugged into the second outlet 2250B associated with "Circuit 2"; and no power cord assemblies 2205 are plugged into the third outlet 2250C associated with "Circuit 3." Accordingly, FIG. 22a illustrates the heating chamber system 100 being powered by two circuits.

In FIG. 22b, the one power cord assembly 2205 is plugged into the first outlet 2250A associated with "Circuit 1"; two power cord assemblies 2205 are plugged into the second outlet 2250B associated with "Circuit 2"; and one power cord assembly 2205 is plugged into the third outlet 2250C associated with "Circuit 3." Accordingly, FIG. 22b illustrates the heating chamber system 100 being powered by three circuits.

A controller 190 having a plurality of power input receptacles 193 and associated power cord assemblies 2205 can be desirable because such a configuration can provide for using the heating chamber system 100 in a variety of locations regardless of the configuration of power outlets 2250 and receptacles 2251. Although the present example illustrates a controller 190 having four power input receptacles 193 associated with a respective power cord assembly 2205, further embodiments can comprise any suitable number of power input receptacles 193 and power cord assemblies 2205 (e.g., one, two, three, four, five, six, seven, eight, nine, or the like). Additionally, a power input receptacle 193 and power cord assembly 2205 can be configured in other suitable ways in further embodiments. For example, in some embodiments, input receptacles 193 need not be physically separate. For example, the controller 190 can instead comprise single power input receptacle 193 having a power cord assembly 2205 that splits into any suitable number of respective cords 2206 and plugs 2207.

In the United States, electrical circuits conventionally come in two common varieties: 15 ampere and 20 ampere. 15 ampere is common for residential construction (e.g., in people's homes) and 20 ampere is common for commercial construction (e.g., apartments, condos, hotels, hospitals, and the like). Some embodiments are configured to utilize all of the energy possible in the beginning of a treatment cycle to increase the chamber's internal air temperature as quickly as possible and lower the overall treatment time.

However, National Electrical Code (NEC) Article 100 states that any "Continuous Load" (a load lasting more than 3 hours) must operate at not more than a maximum current of 80% of the circuit capacity. For example, a device could utilize 15 amperes on a 15 ampere circuit for no more than 3 hours. A device that will operate for more than 3 hours must therefore consume no more than 12 amperes on a 15 ampere circuit.

In some embodiments, a heating chamber system 100 can be expected to operate for more than 3 hours during a cycle. In such embodiments, it can be desirable to utilize 100% of a circuit's current capacity initially during a treatment and not the 80% mandated by NEC Article 100. Accordingly, some embodiments can employ a current consumption method to consume as much current as possible while staying within any limitations or requirements for continuous loads that may be applicable (e.g., the NEC, or the like).

Figure 23:
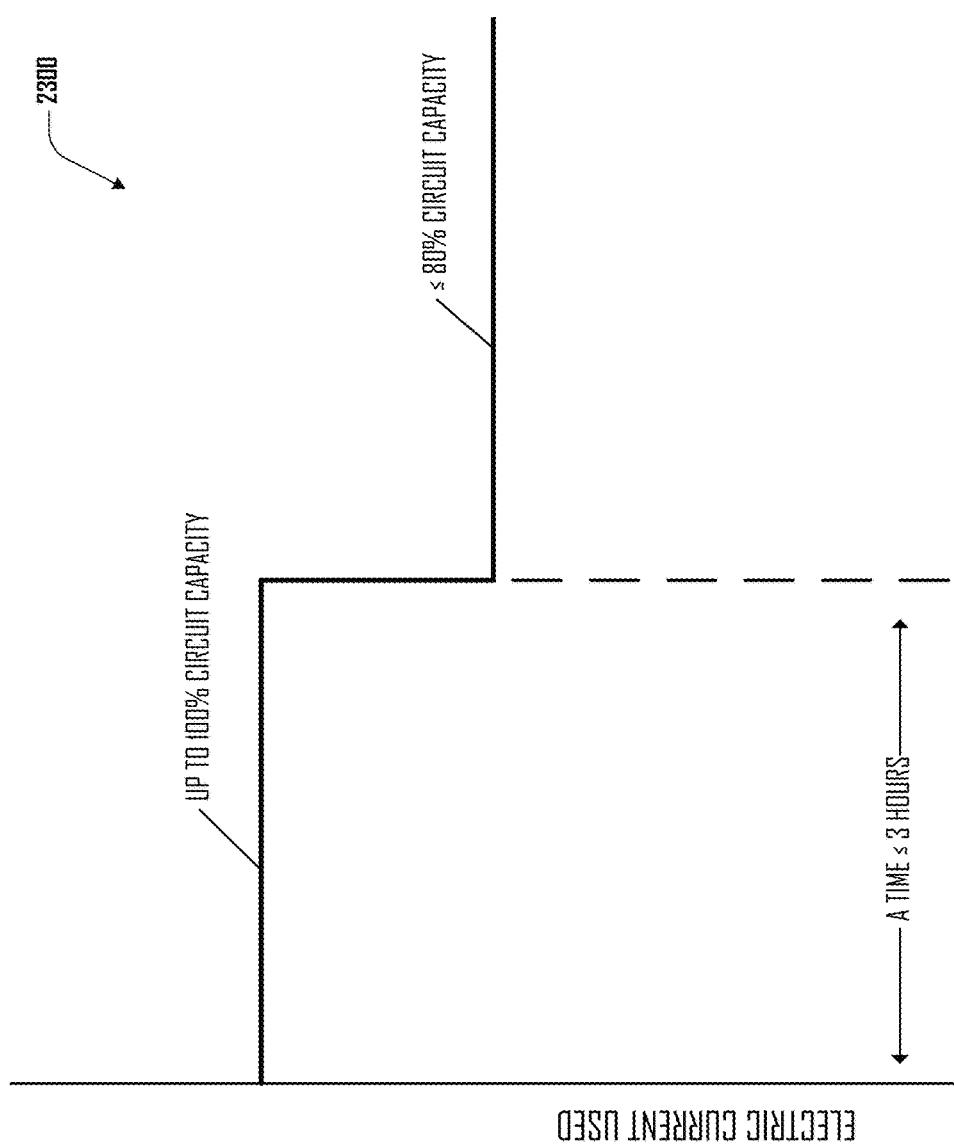
FIG. 23 illustrates a power consumption method in accordance with one embodiment.
Figure 24:
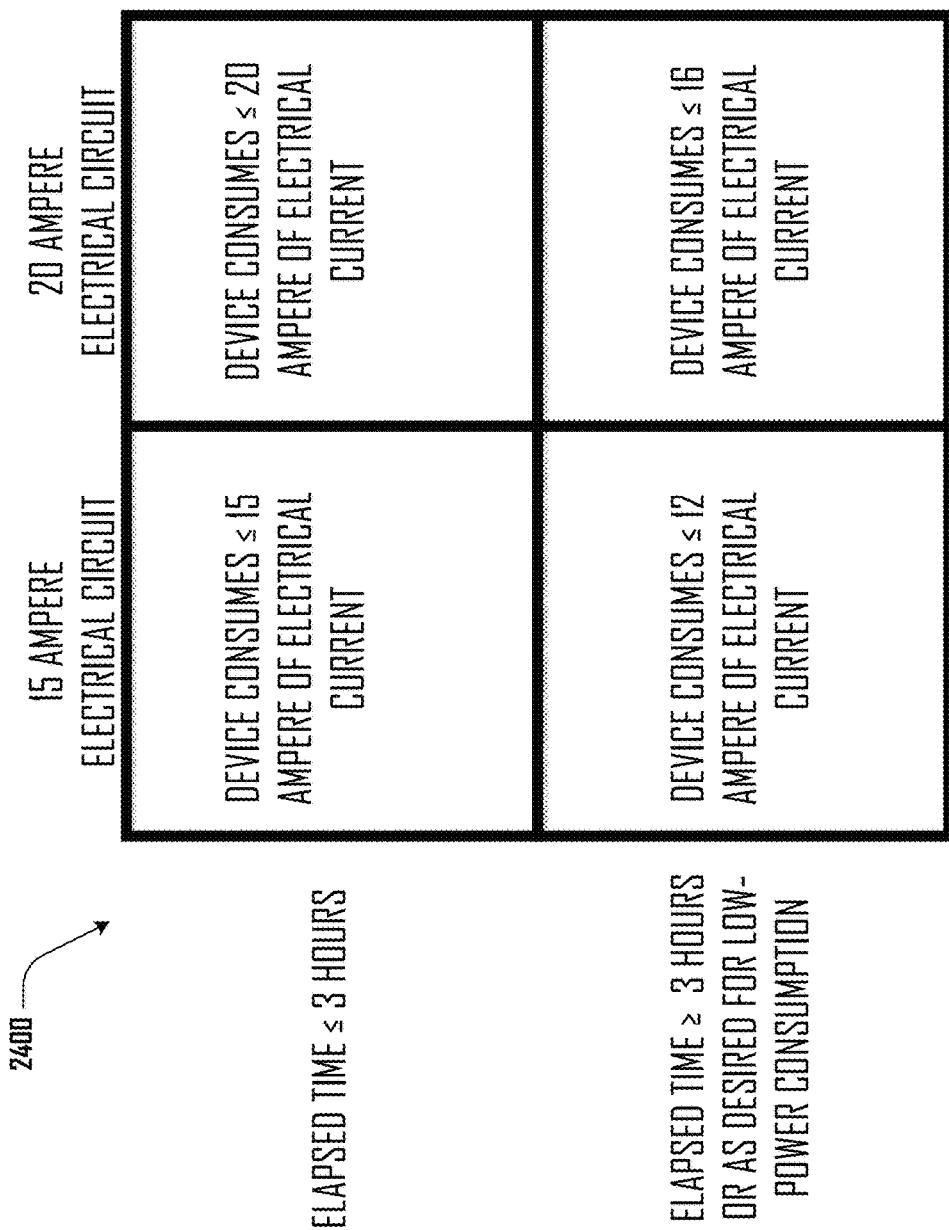
FIG. 24 illustrates further power consumption methods in accordance with further embodiments.

In one example embodiment, the control system 190 can utilize the maximum power available on a circuit for a time of less than 3 hours. After that time, if the treatment is not complete, the heating chamber system 100 can switch to a lower power-consumption mode where it utilizes an amount of power allowed by the NEC's 80% maximum load requirement. FIG. 23 illustrates one example method 2300 in accordance with one embodiment. FIG. 24 illustrates example methods 2400 for 15 and 20 amp circuits.

Figure 25:
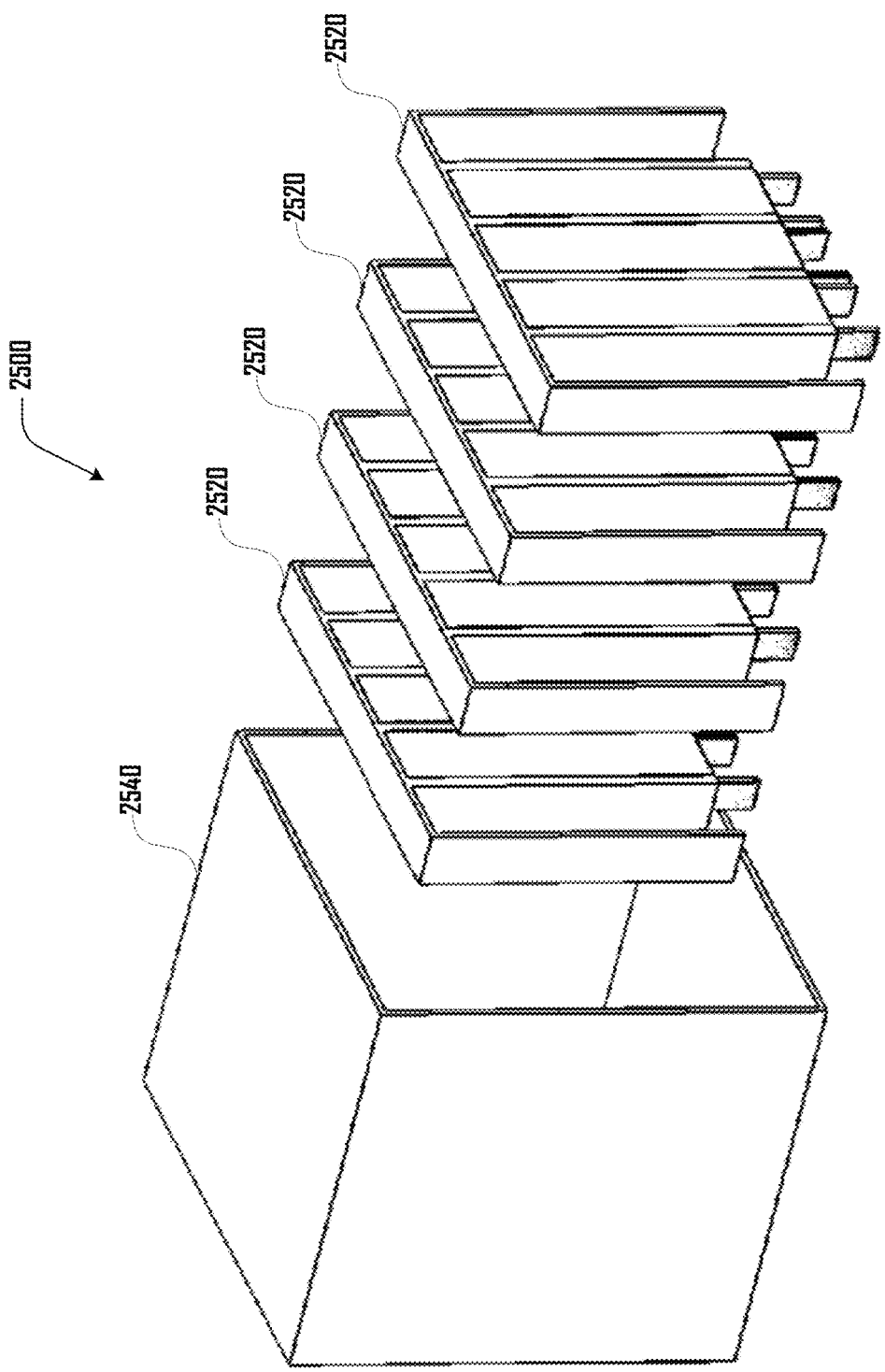
FIG. 25 illustrates an embodiment of a heating assembly that comprises a plurality of individual heating elements.

In various embodiments, the heating chamber system 100 can comprise a heater 130 or other heating array that includes a plurality of independent heating elements as illustrated in FIG. 25, which shows a heating array 2500 comprising four independent heating elements 2520 that are configured to reside within a housing 2540. Similarly, as discussed above, FIG. 20b illustrates heating array 2010 comprising four independent heating elements 2011 that reside within the heater 130. In various embodiments, the elements 2011, 2520 can each be electrically isolated. For example, in various embodiments, the elements 2011, 2520 can be associated with a respective power cord assembly 2005 and power input receptacle 193 that keep the circuits electrically isolated.

In such embodiments, each individual heating element 2520, 2011 can consume an approximate known amount of electric current and the control system 190 or a heater controller can selectively activate or reactive individual heating elements to achieve a desired power consumption.

For example, in one embodiment, a heater 130 can comprise five separate heating elements that each consume four amperes of current. Using the 20 ampere example illustrated in FIG. 20, during the first three hours, all five separate heating elements could be active and consuming 20 amperes of current. However, once three hours has elapsed and further treatment is necessary, the heater 130 can shut down one of the five heating elements so that only four heating elements are active, which would consume 16 amperes of current.

The above examples are only intended to provide example embodiments of power consumption methods, and should not be construed to be limiting on the many embodiments that are within the scope and spirit of the present disclosure. Desired power consumption can vary depending on the treatment parameters and treatment time elapsed. Additionally, power consumption methods can be modified based on laws and electrical conventions within any jurisdiction, including but not limited to the United States. Additionally, in further embodiments, another method to achieve variable current consumption can comprise controlling the amount of electric current allowed to flow through one or more heating element(s).

Figure 26:
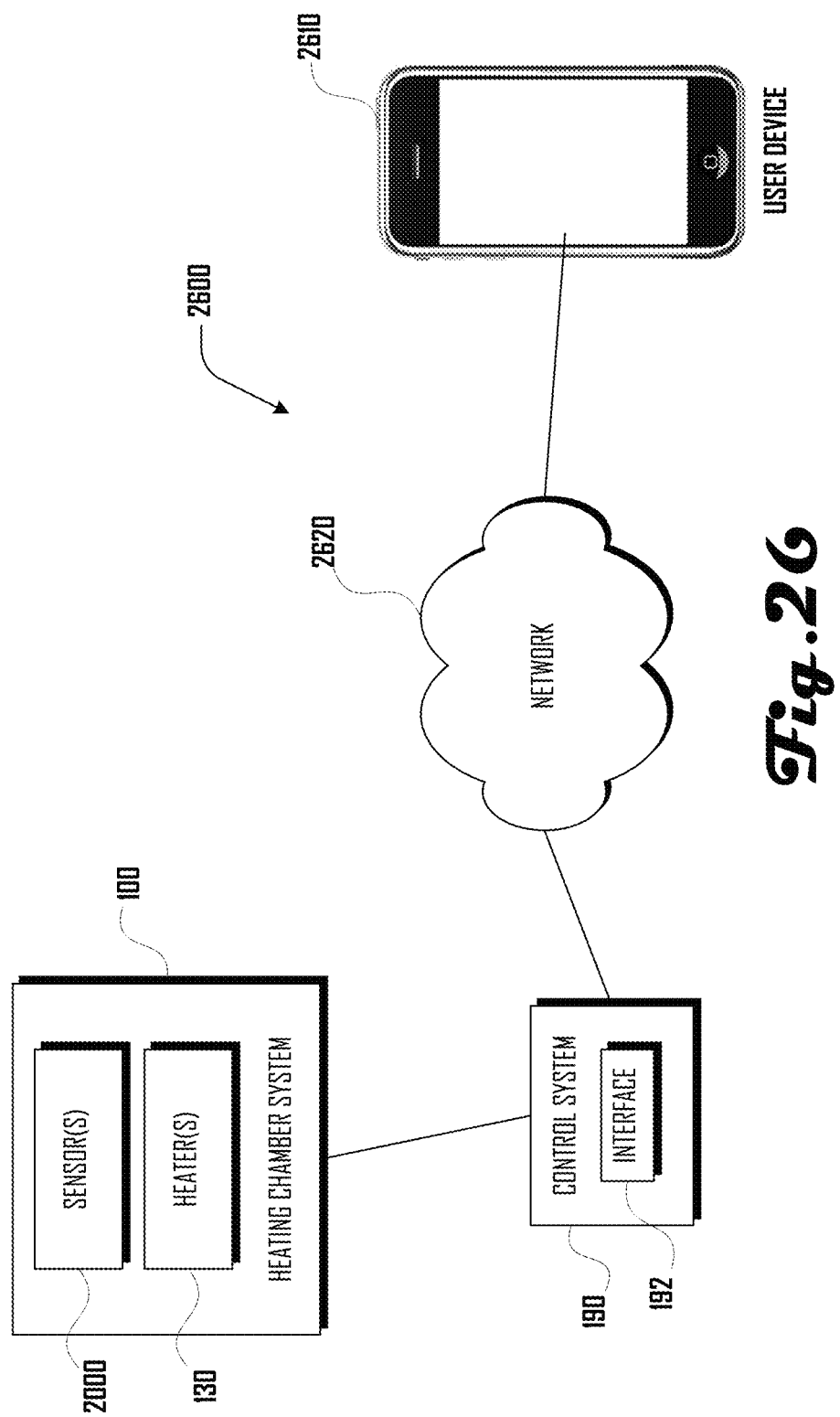
FIG. 26 is an exemplary network diagram of an embodiment of a heating chamber communication network.

The heating chamber system 100 can be controlled in various suitable ways. For example, in one embodiment, the one or more heaters 130 can be set to a desired air temperature, which may or may not be associated with a timer. In further embodiments, the heating chamber system 100 can comprise a sensing array that comprises one or more temperature sensors 2000, that are operably connected to a control system 190 as illustrated in FIG. 26. In various embodiments, the control system 190 can be configured to monitor the temperature of various portions of the chamber 120 and/or objects being treated within the chamber 120.

In some embodiments, the control system 190 can be configured to modify the temperature of portions of the chamber and/or control the treatment time of items 150 within the chamber based on sensing data received from the one or more sensors 2000. In one example, where data from the one or more sensors 2000 indicates that the overall chamber temperature is too low or too high, the control system 190 can raise or lower the temperature accordingly. In another example, where data from the one or more sensors 2000 indicates that temperature of a portion of the chamber or item is too low or too high, the control system 190 can raise or lower the temperature accordingly.

Chamber temperature can be raised and/or lowered in various suitable ways. For example, the temperature of air being generated by the one or more heaters 130 can be raised or lowered; the air flow to portions of the heating assembly 200 can be increased or decreased (e.g. to the heating tube 205, the branch tube 915 and/or heating panel 1500); the air flow out of ports, either individually or as a group can be increased or decreased, or the like.

In further embodiments, one or more heating chamber systems 100 can be controlled remotely and/or locally via a user device 2610 and/or interface 192 of the control system 190 as illustrated in the heating chamber communication network 2600 of FIG. 26. The heating chamber communication network 2600 can comprise one or more heating chamber systems 100 coupled to one or more control systems 190, which are operably connected to a user device 2610 via a network 2620. In various embodiments, the user device 2610 can be configured to receive data regarding the state of the heating chamber 100 and can be configured to provide control instructions to the control system 190, which can in turn control the heating chamber 100. Alternatively or additionally, such control instructions can be provided via the interface 192 of the control system 190.

Additionally, in various embodiments, data associated with a heating chamber system 100 can be tracked and logged, which can provide for oversight by managers of workers using the one or more heating chamber systems 100 associated with the communication network 2600. For example, data such as treatment cycle times, durations, temperature readings, treatment location, and the like can be logged and presented on various suitable user devices 2610.

In further embodiments, alerts can be provided based on various conditions of a heating chamber system 100. For example various user devices 2610 can receive an alert when a treatment cycle begins; when a treatment cycle ends; at a defined time before a treatment cycle is estimated or scheduled to end; if a heating chamber system 100 experiences a fault or error state; or the like.

Accordingly, in some embodiments, workers using a heating chamber system 100 to treat items at a location can setup the heating chamber system 100, initiate a treatment cycle and then monitor the treatment cycle remotely and return to the location at or near when the treatment cycle is complete or to attend to errors, faults or other issues that may arise during a treatment cycle. In other words, in various embodiments, workers need not be present at the location to monitor a treatment cycle, which can be desirable for worker productivity, especially where treatment cycles last a number of hours and/or where workers are attending to a plurality of a heating chamber system 100 at the same time. For example, a team of workers can setup a first a heating chamber system 100 in a first room of a hotel and initiate a first treatment cycle and monitor the first treatment cycle remotely while setting up further heating chamber systems 100 in other rooms of the hotel.

FIGS. 28*a*, 28*b*, 29*a*, 29*b*, 30*a*, 30*b*, and 31-37 illustrate various example interfaces that can be presented on a suitable user device 2610 and/or control system 190 for configuring, monitoring or viewing a history associated with a heating chamber system 100.

Although the user device 2610 is illustrated as being a smart phone in the embodiment shown in FIG. 26, in further embodiments, the user device 2610 can comprise, a laptop computer, desktop computer, server system, tablet computer, gaming device, wearable computer, or the like. Additionally, the network 2620 can comprise any suitable wired and/or wireless network, including the Internet, a Wi-Fi network, a Local Area Network (LAN), a Wide Area Network (WAN), a cellular network, or the like.

Figure 27:
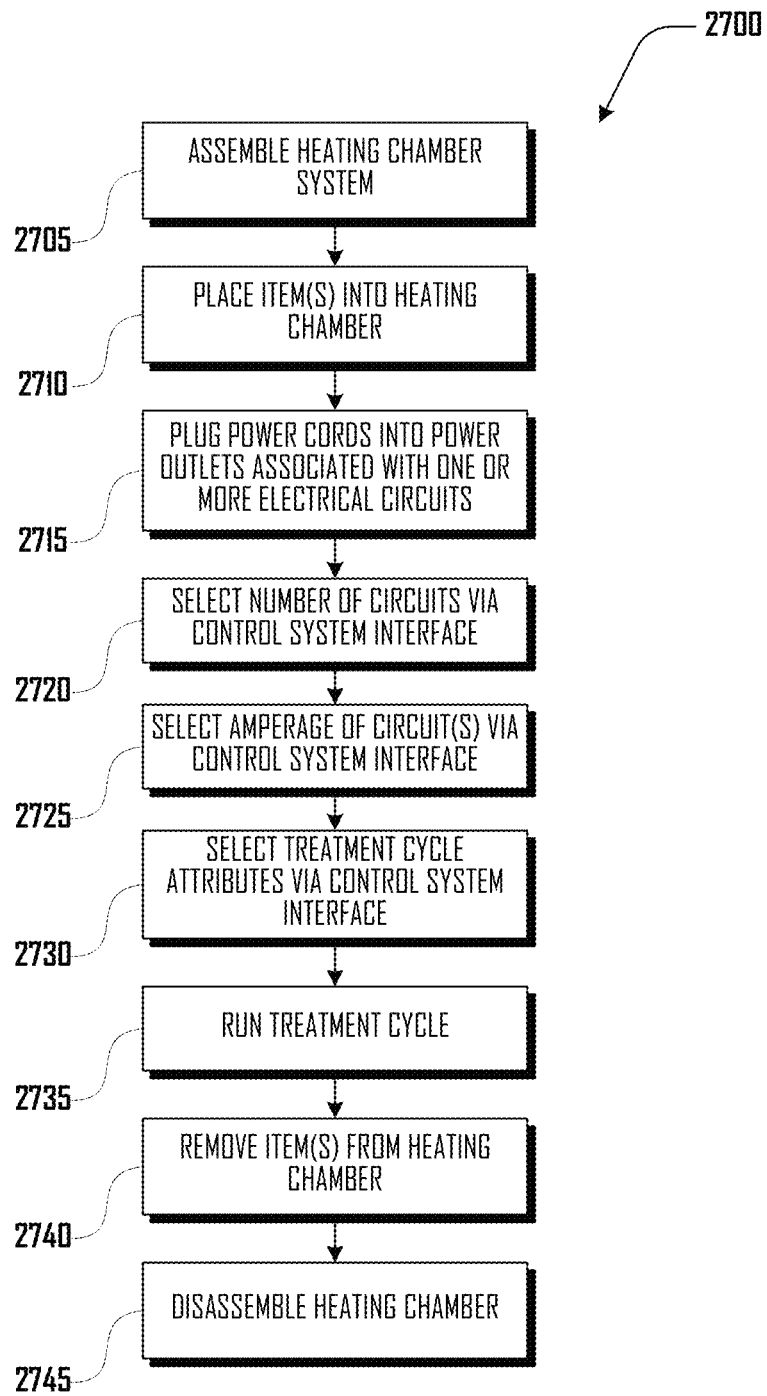
FIG. 27 illustrates an example method of operating a heating chamber in accordance with an embodiment.

FIG. 27 illustrates an example method 2700 of operating a heating chamber in accordance with an embodiment. The method begins in block 2705 where a heating chamber system 100 system is assembled and continues to block 2710 where one or more items 150 are placed into the chamber 120 of the heating chamber system 100. For example, in various embodiments, the heating chamber system 100 can be used to treat items 150 infested by bedbugs by transporting the heating chamber system 100 to the location of the items 150 (e.g., a bed, mattress, and chairs within a hotel room). This can be desirable as opposed to transporting the infested items 150 to a separate location having the heating chamber system 100 because transport of the infested items 150 can result in the spread of bedbugs to other locations and transport of items to a remote location can be time-consuming and expensive.

Accordingly, a heating chamber system 100 that can be transported to various locations and assembled can be desirable. For example, in various embodiments, it can be desirable for the heating chamber system 100 to assume an assembled configuration and a disassembled configuration, where the disassembled configuration is operable to fit through standard doors (i.e., a door having a width of 2'0", 2'4", 2'8", 2'10", 3'0" or 3'6" and a height of 6'6", 6'8", 7'0" or 8'0"), whereas the assembled configuration would not be operable to fit through such standard doors. In other words, in various embodiments, it can be desirable for the heating chamber system 100 to be assembled and disassembled such that it can be transported to and from rooms within houses, offices, hotels and the like. In one example, assembly of the heating chamber system 100 can include steps as illustrated sequentially in FIGS. 19, 18 and 1 respectively.

Returning to the method 2700, in block 2715, power cords are plugged into power outlets associated with one or more electrical circuits (and in some preferred embodiments, exactly two or three electrical circuits). In block 2720, a number of circuits is selected via the interface 192 of the control system 190, and in block 2725, the amperage of the one or more circuits is selected via the interface 192 of the control system 190.

For example, as discussed above, in various embodiments, the heating chamber system 100 can be configured to be transported to various locations such as different rooms within a hotel, different offices within a building, different rooms within a house, and the like. Accordingly, it can be desirable to have the heating chamber system 100 configurable so that it can operate with and adapt to the varying availability and amperage of power outlets, receptacles and separate circuits at each given location.

For example, as illustrated in FIGS. 22a and 22b, some embodiments can include a control system 190 having a plurality of cords and plugs that can be plugged into different receptacles and power outlets that may be available within reach in a given location. Some locations may provide for plugging into one, two, three or more circuits, or the like. In other words, various embodiments can provide for powering the heating chamber system 100 using only a locally available power source at the treatment location, without relying on a battery or other power source such as a generator or the like.

Figure 28A:
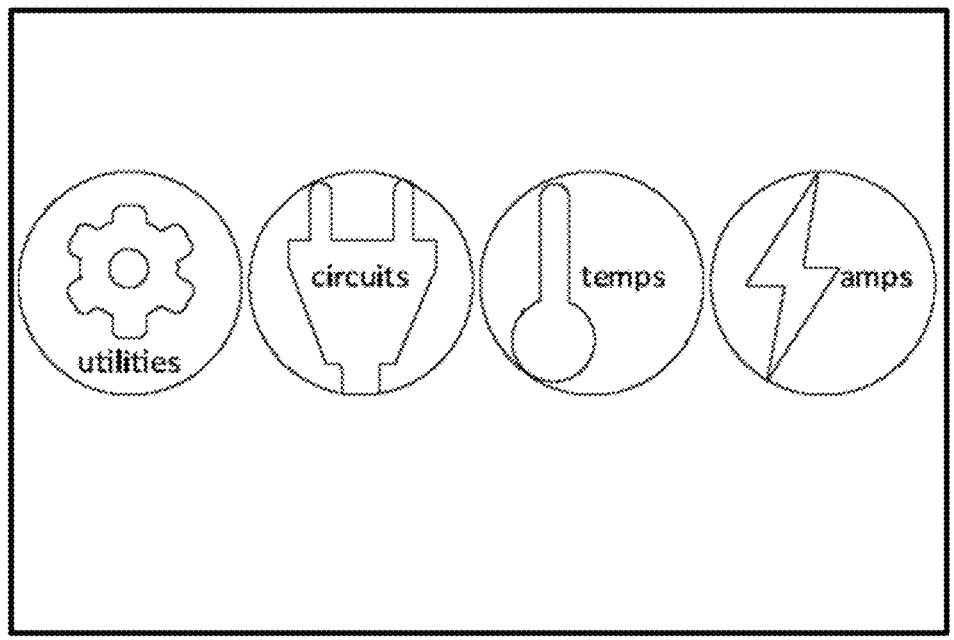
FIGS. 28a, 28b, 29a, 29b, 30a and 30b illustrate examples of a control system interface in accordance with various embodiments.
Figure 28B:
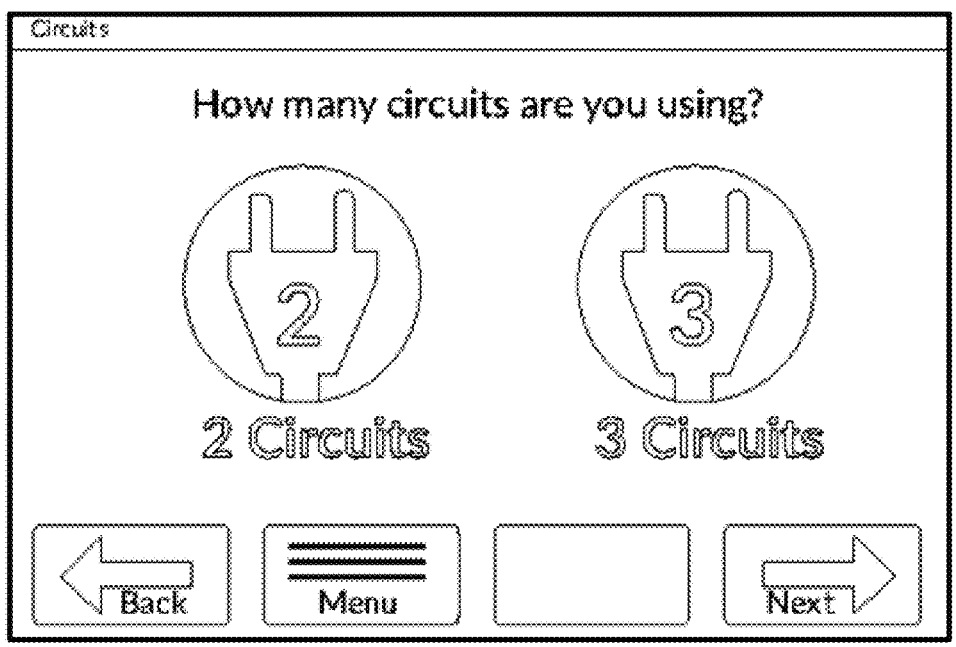
Figure 29A:
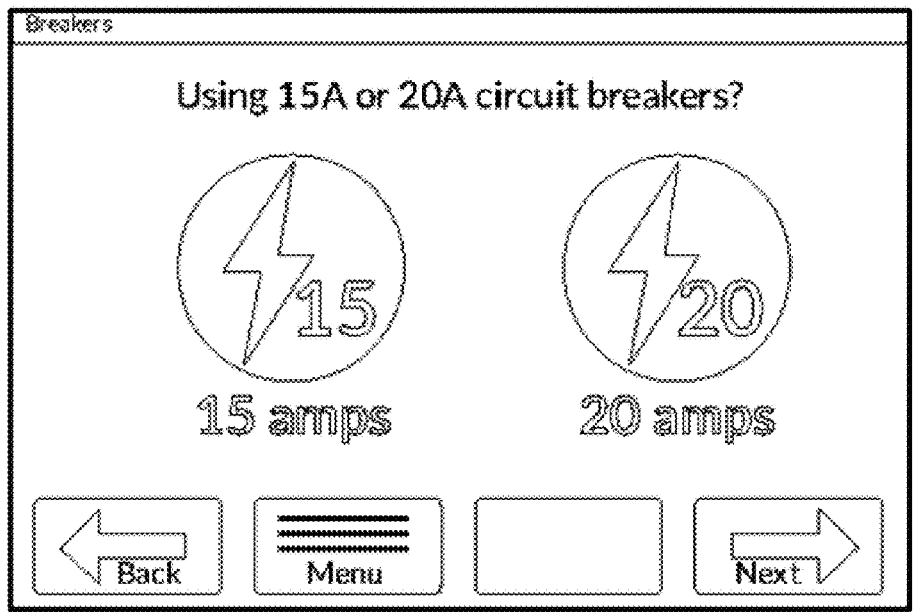

FIGS. 28a and 28b illustrate example interfaces that can be presented at the control system 190 and/or user device 2610 (FIG. 26), which can be used to indicate the number of circuits that the heating chamber system 100 is plugged into and FIGS. 28a and 29a illustrate example interfaces that can be presented at the control system 190 and/or user device 2610 (FIG. 26), which can be used to indicate the amperage of circuits that the heating chamber system 100 is plugged into.

Figure 29B:
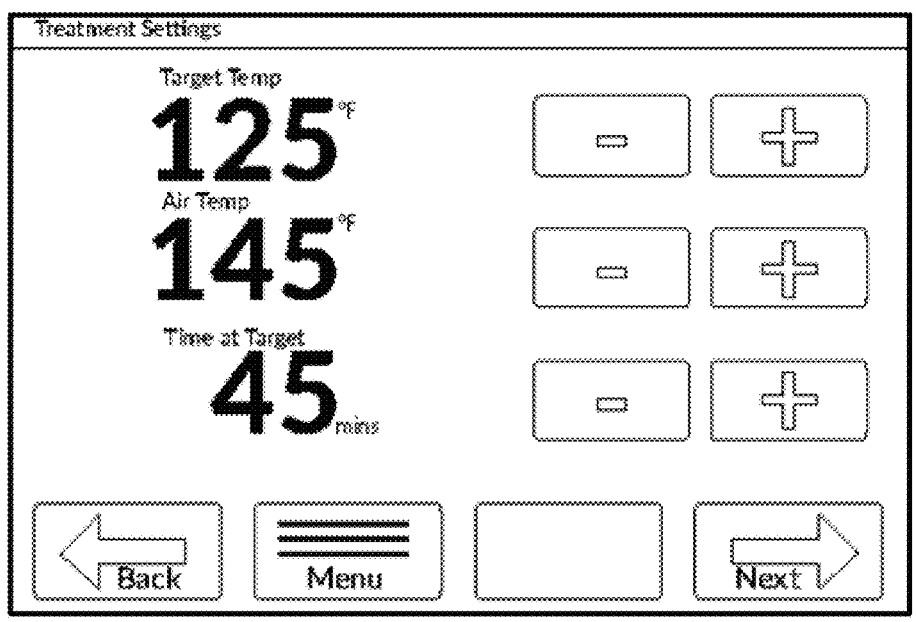
Figure 30A:
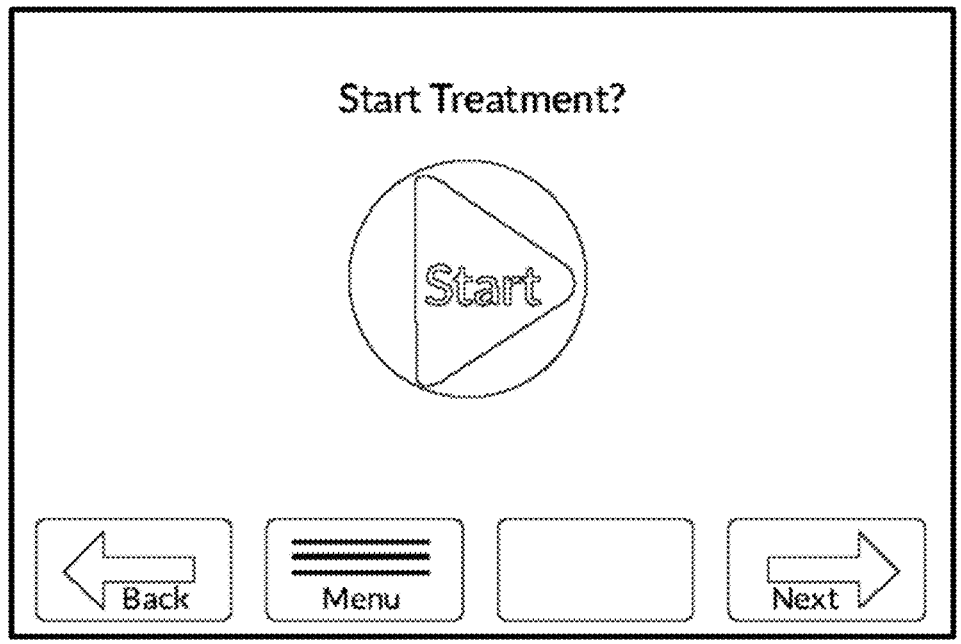
Figure 30B:
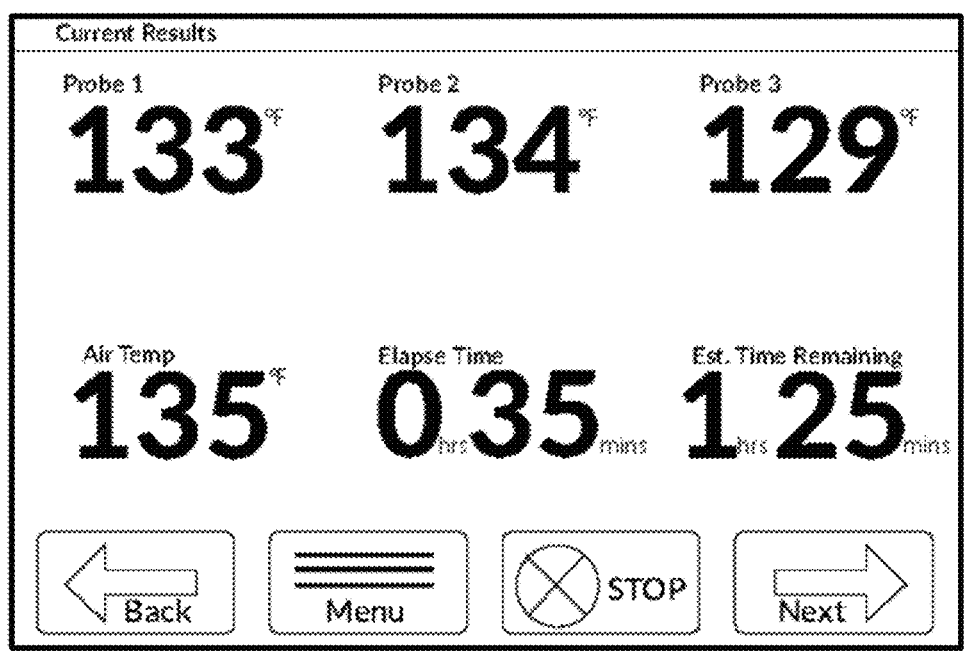
Figure 31:
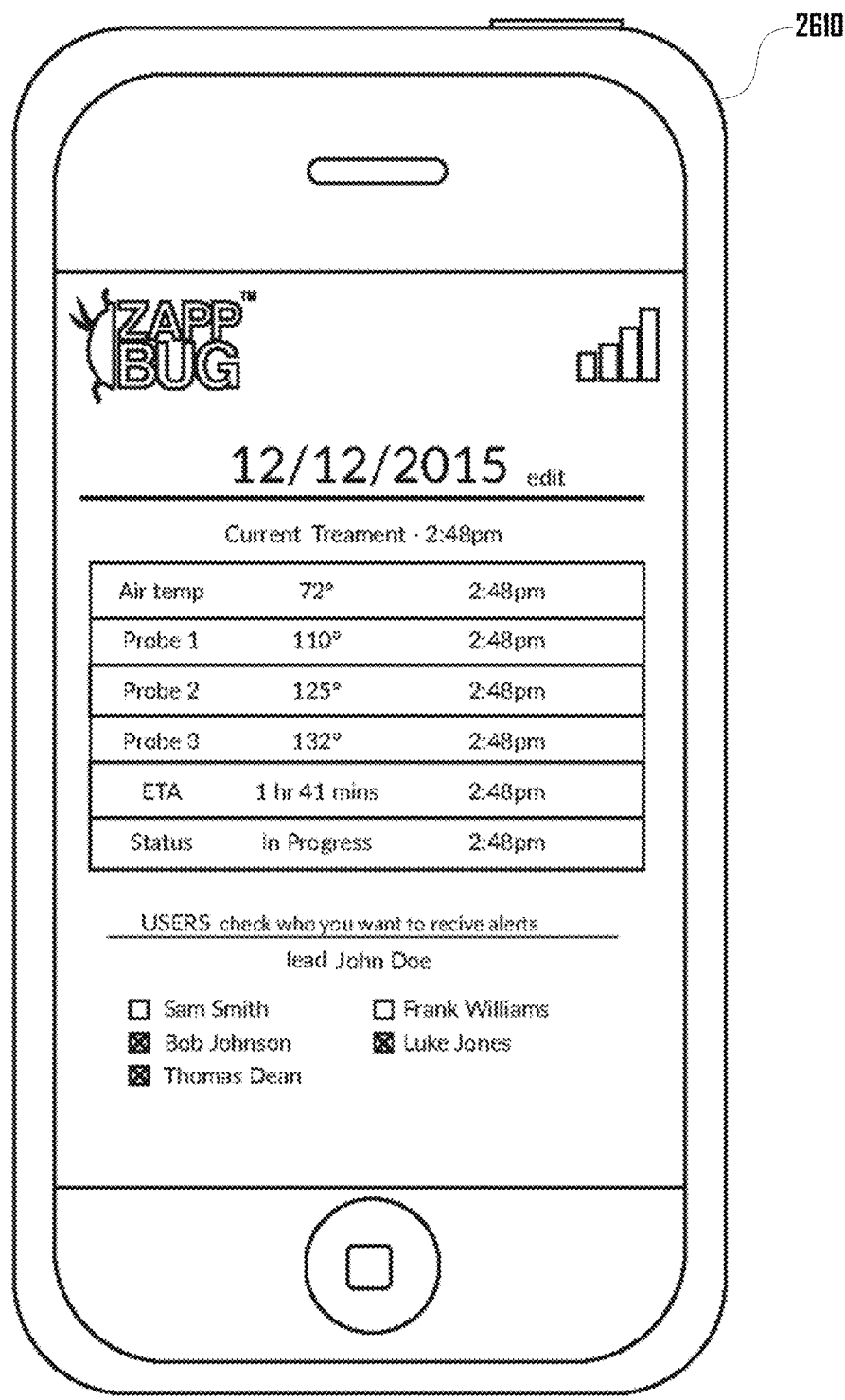
Figure 32:
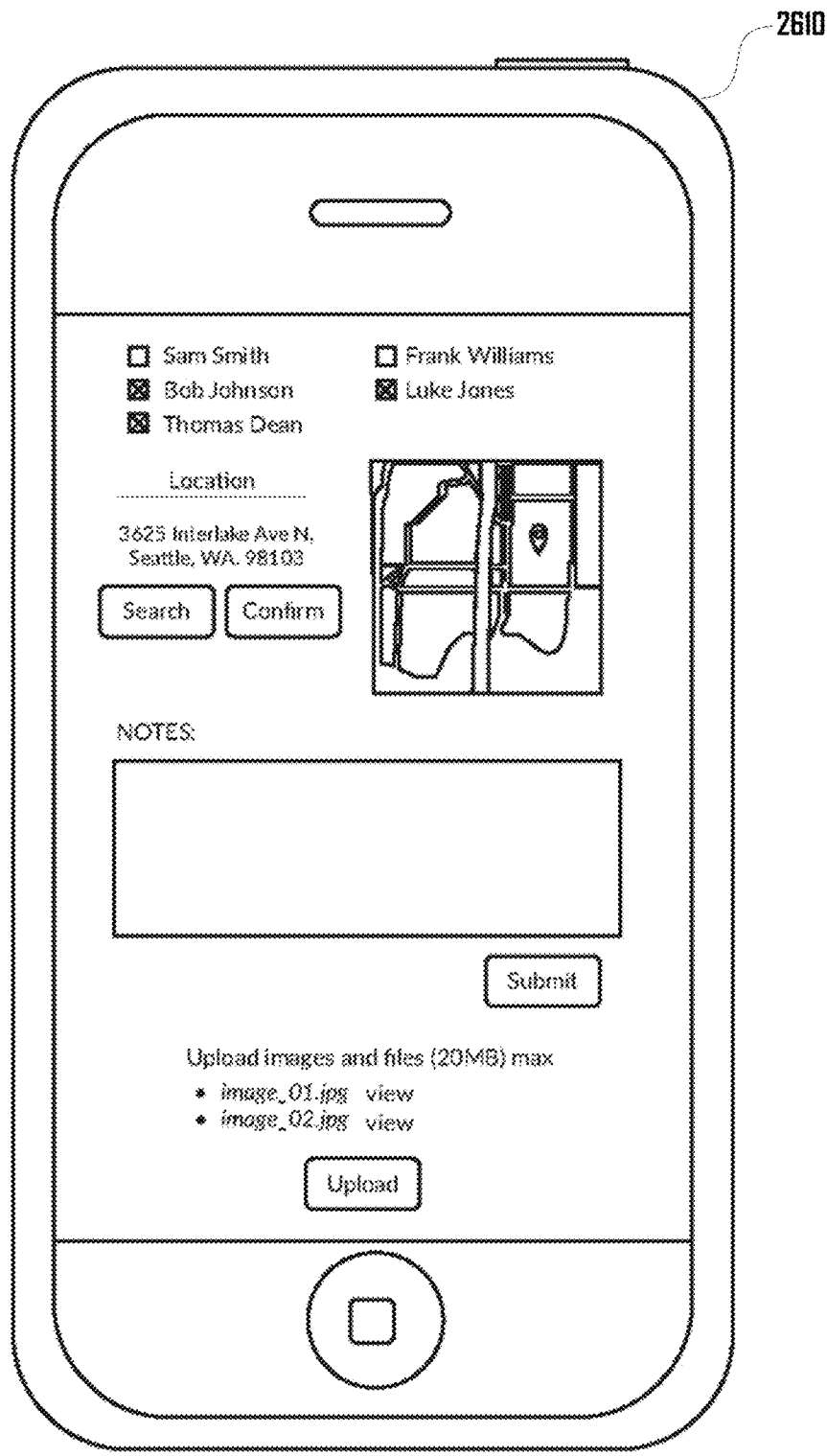
Figure 33:
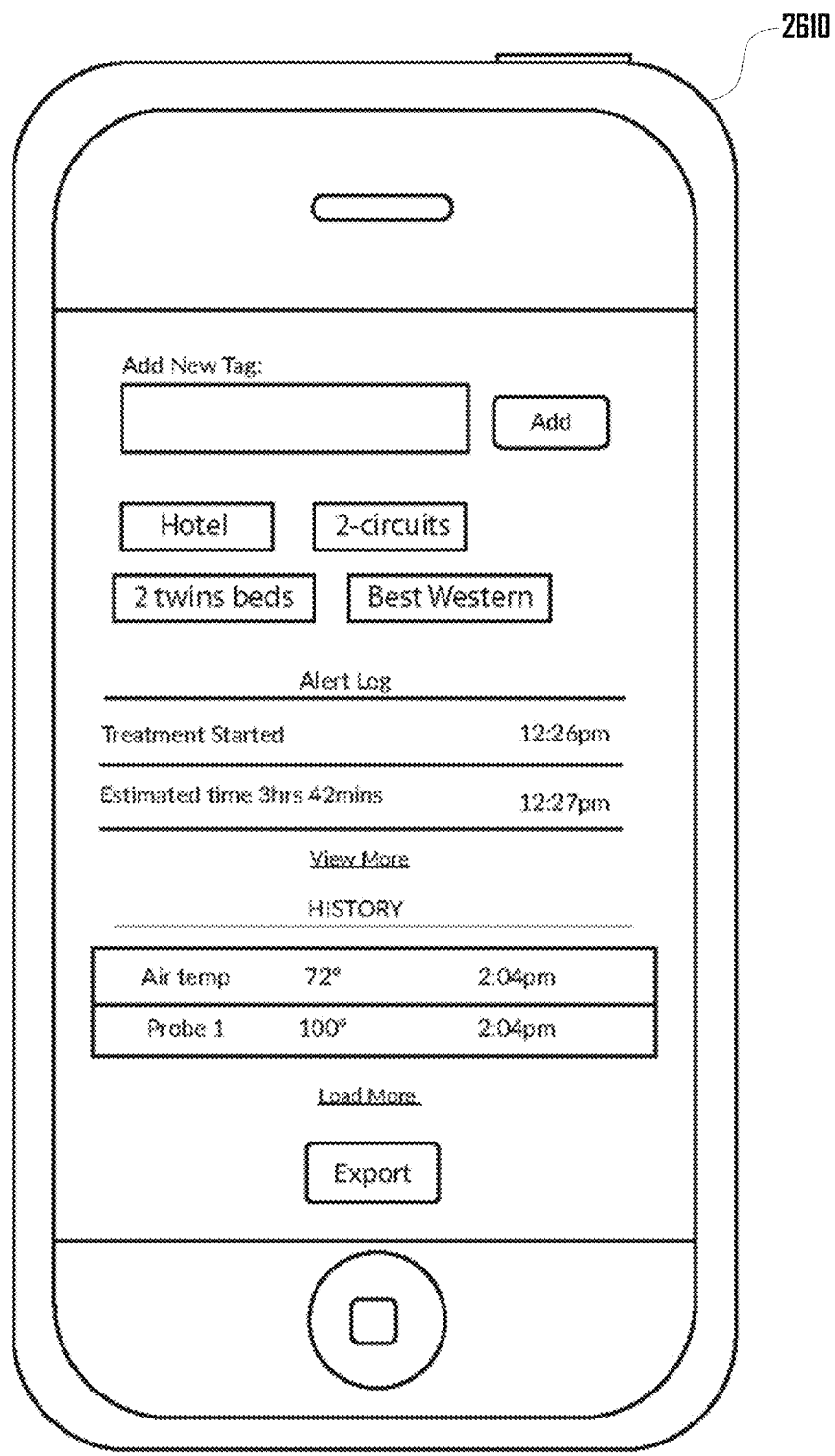
Figure 34:

Returning to the method 2700 of FIG. 27, in block 2730, treatment cycle attributes are selected via the control system interface 192 and in block 2735 the treatment cycle is run. For example, FIGS. 28a and 29b illustrate example interfaces that can be presented at the control system 190 and/or user device 2610 (FIG. 26) for selecting treatment cycles attributes that can include a target temperature, air temperature, time at target temperature, and the like. FIGS. 30a, 30b, 31, 34 and 35 illustrate example interfaces that can be presented at the control system 190 and/or user device 2610 (FIG. 26) for initiating and monitoring a treatment cycle. For example, as illustrated in FIG. 30b, a user can monitor temperatures detected by one or more sensors, current air temperature, elapsed time, and estimated time remaining in the treatment cycle.

Returning to the method 2700 of FIG. 27, in block 2740, the one or more treated items 150 are removed from the chamber 120 of the heating chamber system 100 and the heating chamber system 100 is disassembled in block 2745. For example, as discussed above, the heating chamber system 100 can be disassembled and moved to another location for treating items at the new location.

Although, FIG. 27 illustrates an example method 2700, it should not be construed to be limiting on the wide variety of variations of such methods that are within the scope and spirit of the present disclosure. For example, it should be clear that various steps can be done in any suitable order, including the selection of amperage and number of circuits of block 2720 and 2725. Additionally, in further embodiments, such selection can occur automatically without human interaction. For example, in some embodiments, the control system 190 can be configured to automatically detect the amperage the circuits that the heating chamber system 100 is plugged into and/or automatically detect the number of circuits that the heating chamber system 100 is plugged into.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A heating chamber system comprising:
an enclosed heating chamber;
a bottom portion defining a lower portion of the enclosed heating chamber and includes a floor skirt and a floor;
a top portion defining an upper portion of the enclosed heating chamber and including a plurality of sidewalls and a roof;
a collapsible architecture configured to support the top portion; and
a heating system comprising:
a heater configured to generate and expel heated air, the heater including a set of electrically isolated heating elements;
a control system operably coupled to the heater and configured to control the generation of the heated air by the heater, the control system including:
a touch-screen interface; and
more than two electrically isolated power cord assemblies configured to simultaneously provide power of a same voltage to a respective electrically isolated heating element of the set of electrically isolated heating elements, the power of the same voltage originating from separate outlet receptacles associated with one or more circuits having the same voltage that the power cord assemblies are respectively plugged into simultaneously, each power cord assembly of the power cord assemblies having a cord and a plug;
wherein the control system is operably connected to a remote user device via a wireless network such that the control system can send data regarding a state of the heating chamber to the user device and such that the user device can send control instructions to the control system such that the control system controls the state of the heating chamber based on the control instructions received from the user device;
wherein the control system is configured to generate a treatment cycle based on the instructions received from the remote user device and the touch-screen interface, where the treatment cycle includes:
a first portion that substantially utilizes a maximum power available from the one or more power circuits that the heating chamber system draws the power from, the first portion having a duration of about 3 hours; and
a second portion after the first portion having a lower power-consumption mode that utilizes 80% or less of the maximum power available from the one or more power circuits;
wherein the control system is further configured to generate the treatment cycle based at least in part on a received first indication of whether the power cord assemblies are coupled with two or three separate electrical power circuits of the one or more power circuits, the first indication receivable via at least one of the user device and the touch screen interface;
wherein the control system is further configured to generate the treatment cycle based at least in part on a received second indication of an amperage of the two or three separate electrical power circuits of the one or more power circuits, the second indication receivable via at least one of the user device and the touch-screen interface.

2. The heating chamber system of claim 1, further comprising the heater disposed within the enclosed heating chamber.

3. The heating chamber system of claim 1 further comprising an elongated heating assembly coupled to the heater and configured to receive the heated air from the heater and introduce at least a portion of the heated air to the enclosed heating chamber.

4. The heating chamber system of claim 3, wherein the elongated heating assembly comprises a heating tube having an air-permeable mesh strip that defines a portion of a length of the heating tube.

5. A heating chamber system for treating items infested by insects comprising:
an enclosed heating chamber;
a bottom portion defining a lower portion of the enclosed heating chamber and including a floor skirt and a floor;
a top portion defining an upper portion of the enclosed heating chamber and including a plurality of sidewalls and a roof, the top portion coupled to the floor skirt about a bottom edge of the top portion;
a collapsible architecture configured to support the top portion;
a heater disposed within the enclosed heating chamber and configured to generate and expel heated air, the heater including a heating array having four electrically isolated heating elements;
an elongated heating assembly coupled to the heater configured to receive the heated air and introduce at least a portion of the heated air to the enclosed heating chamber;
a control system disposed external to the heating chamber and operably coupled to the heater and configured to control the generation of the heated air by the heater, the control system including:
a touch-screen interface configured to present controls for the heater; and
four electrically isolated power cord assemblies configured to simultaneously provide power of a same voltage to a respective heating element of the four electrically isolated heating elements, the power of the same voltage originating from four separate outlet receptacles associated with one or more circuits having the same voltage that the power cord assemblies are respectively plugged into simultaneously, each power cord assembly of the power cord assemblies having a cord and a plug;
wherein the control system is operably connected to a remote user device via a wireless network such that the control system sends data regarding a state of the heating chamber to the user device and such that the user device sends control instructions to the control system and the control system controls the state of the heating chamber based on the control instructions received from the user device;
wherein the control system is configured to generate a heating treatment cycle based on the instructions receivable from the remote user device and the touch-screen interface, where the treatment cycle includes:
a first portion that substantially utilizes a maximum power available from the one or more power circuits that the heating chamber system draws the power from, the first portion having a duration of about 3 hours; and
a second portion after the first portion having a lower power-consumption mode that utilizes 80% or less of the maximum power available from the one or more power circuits;
wherein the control system is further configured to generate the treatment cycle based at least in part on a received first indication of whether the power cord assemblies are coupled with two or three separate electrical power circuits of the one or more power circuits, the first indication receivable via the user device and the touch-screen interface; and
wherein the control system is further configured to generate the treatment cycle based at least in part on a received second indication of an amperage of the two or three separate electrical power circuits of the one or more power circuits, the second indication receivable via the user device and the touch-screen interface.

6. The heating chamber system of claim 5, wherein the heating chamber system is configured to assume a disassembled configuration operable to fit through standard doors, and wherein the heating chamber system is configured assume an assembled configuration that is not operable to fit through the standard doors.

7. A plurality of separate heating chamber systems for treating items infested by insects, the plurality of separate heating chamber systems each including the heating chamber system of claim 5,
wherein the user device is remote from each separate heating chamber system of the plurality of separate heating chamber systems and is configured to receive the data regarding the state of the each separate heating chamber system of the plurality of separate heating chamber systems and control the each separate heating chamber system of the plurality of separate heating chamber systems.

8. The heating chamber system of claim 5, wherein the touch-screen interface and the user device are configured to display:
temperature detected by one or more sensors associated with the heating chamber,
current air temperature of the heating chamber,
elapsed time of the treatment cycle, and
estimated time remaining in the treatment cycle.

9. The heating chamber system of claim 5, wherein the wireless network comprises the Internet.

10. The heating chamber system of claim 5, wherein the user device receives an alert from the control system when:
the treatment cycle begins;
when the treatment cycle ends;
at a defined time before the treatment cycle is estimated or scheduled to end; and
when the heating chamber system experiences a fault or error state.

11. The heating chamber system of claim 5,
wherein the first portion of the treatment cycle that utilizes a maximum power available from the one or more power circuits that the heating chamber system draws the power from comprises having all of the four electrically isolated heating elements active; and
wherein the second portion of the treatment cycle having the lower power-consumption mode that utilizes 80% or less of the maximum power available from the one or more power circuits comprises shutting off a first subset of the four electrically isolated heating elements so that a second subset of remaining active heating elements of the four electrically isolated heating elements utilizes 80% or less of the maximum power available from the one or more power circuits.

12. The heating chamber system of claim 11, wherein the four electrically isolated heating elements consists of five electrically isolated heating elements, wherein the first subset consists of one heating element of the five electrically isolated heating elements and wherein the second subset consists of four heating elements of the five electrically isolated heating elements that are different from the one heating element of the first subset.

13. The heating chamber system of claim 12, wherein each heating element of the five electrically isolated heating elements can consume four amperes of current, wherein the five electrically isolated heating elements can consume 20 amperes of current, and wherein the second subset consumes 16 amperes of current.

* * * * *